Nov. 8, 1955    A. A. KNEE    2,722,900
SANDWICH MAKING MACHINE
Filed July 13, 1951    16 Sheets-Sheet 1
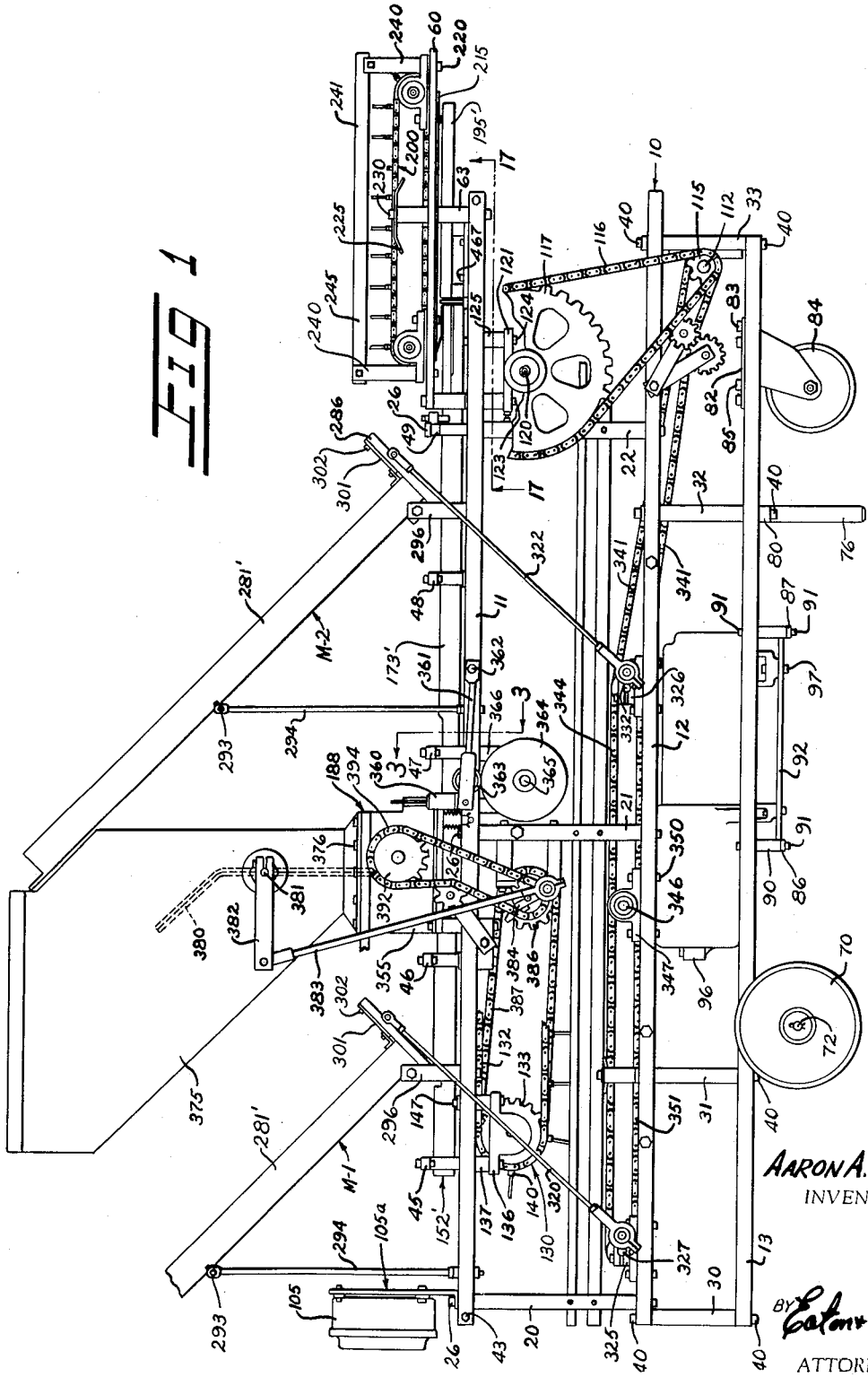
Aaron A. Knee,
INVENTOR.
By Eaton & Bell
ATTORNEYS.

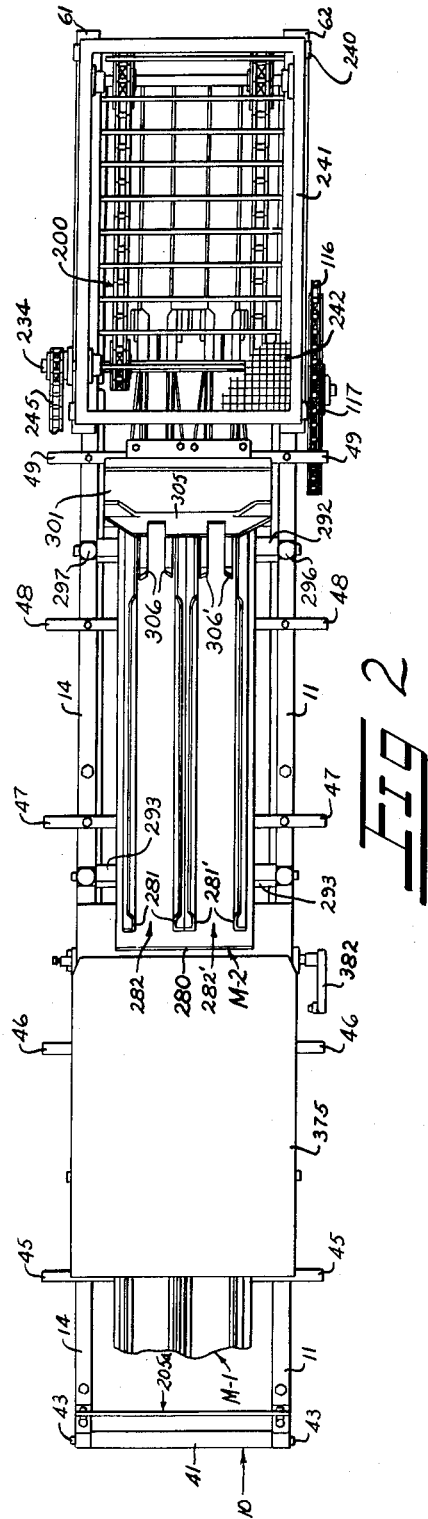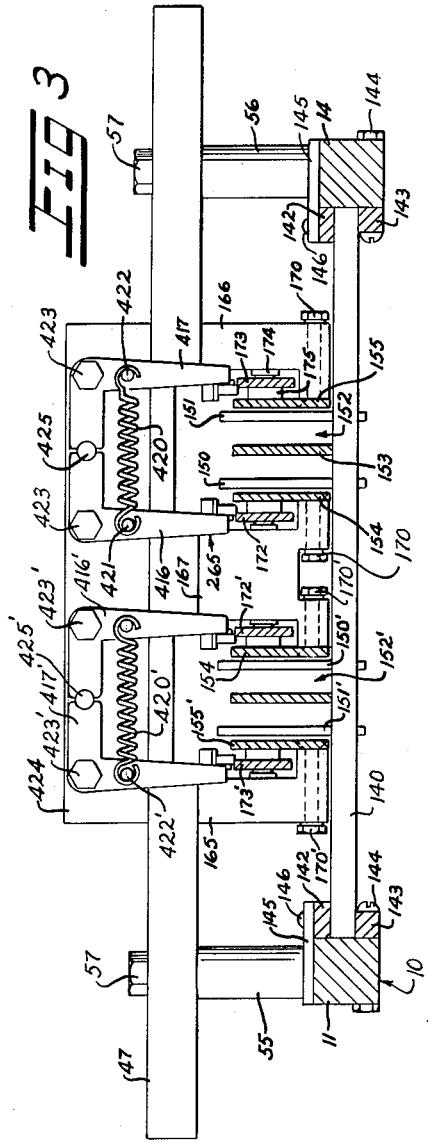

Nov. 8, 1955
A. A. KNEE
2,722,900
SANDWICH MAKING MACHINE
Filed July 13, 1951
16 Sheets-Sheet 3
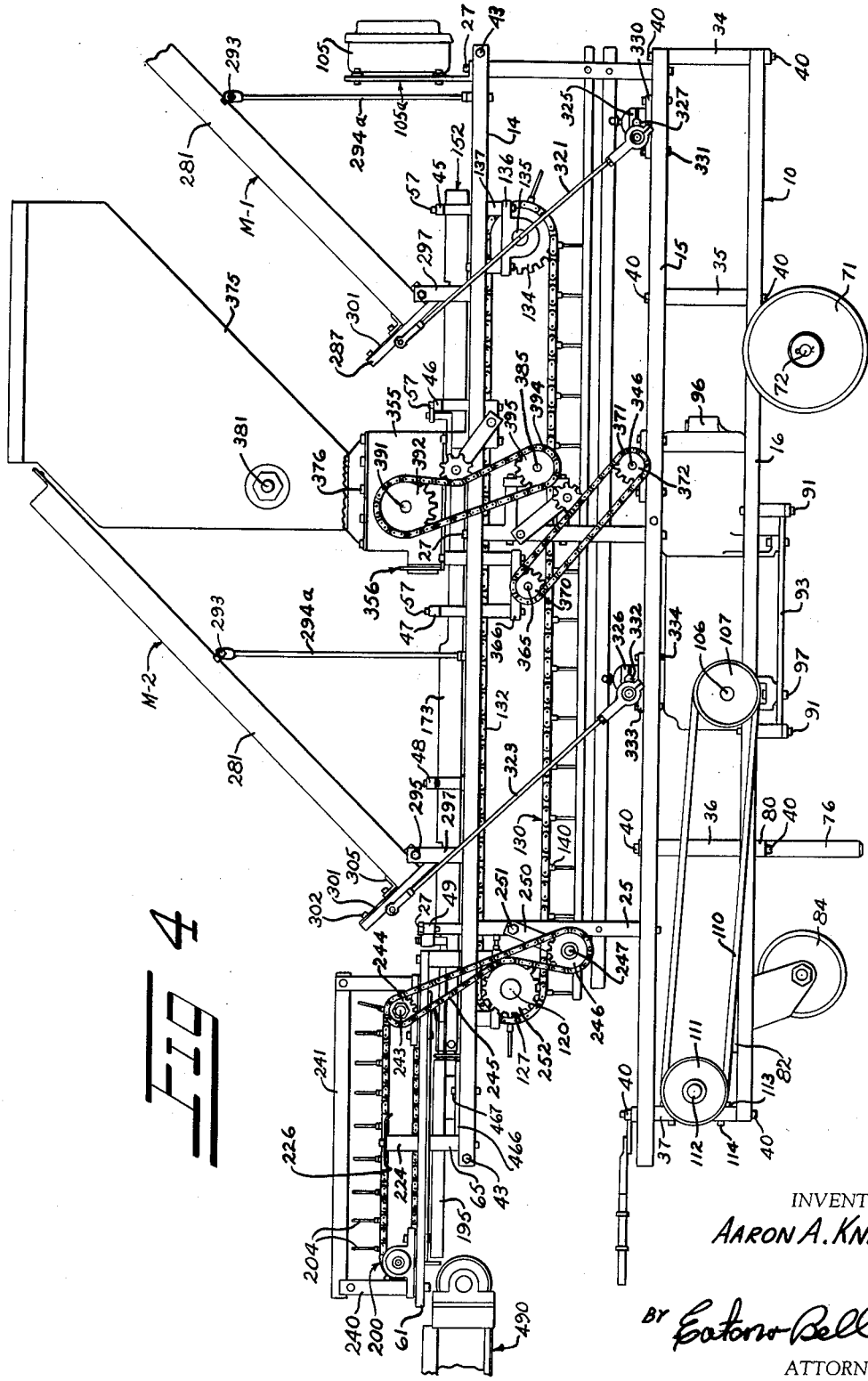
INVENTOR:
AARON A. KNEE.
BY Eaton+Bell
ATTORNEYS.

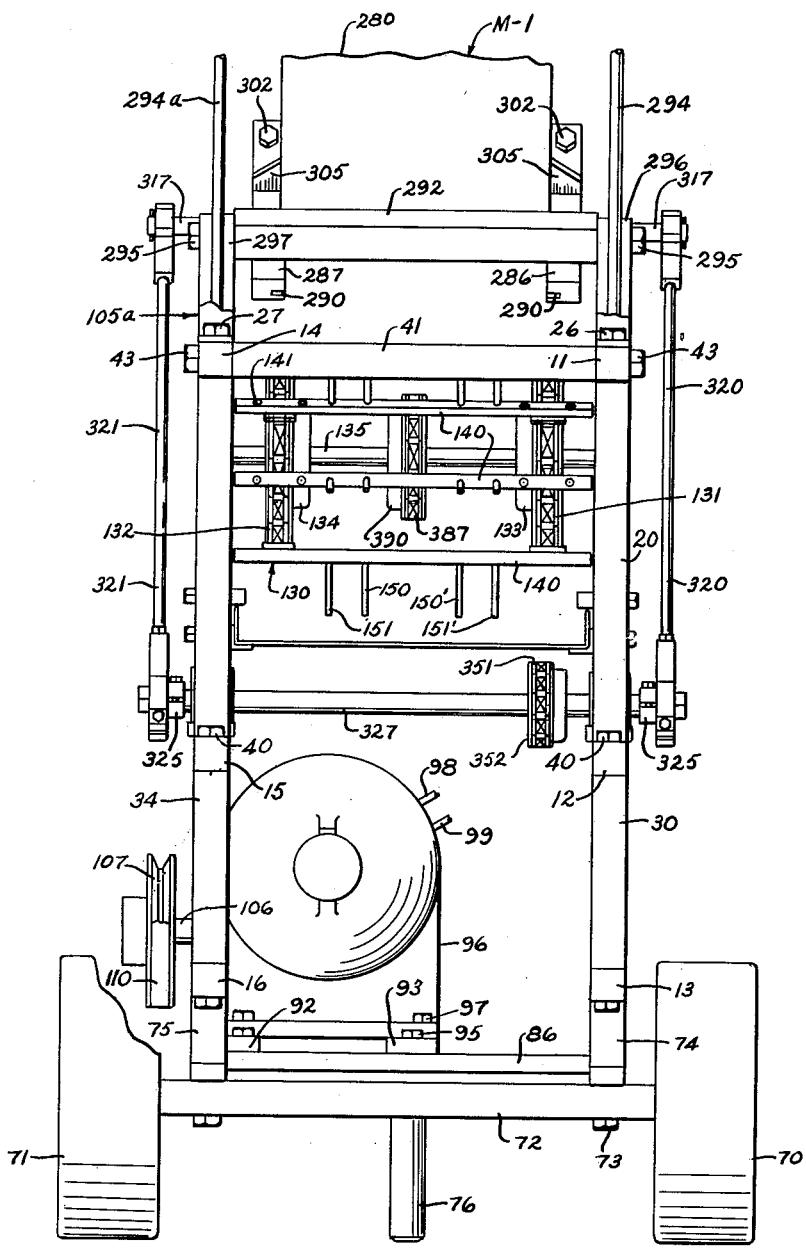

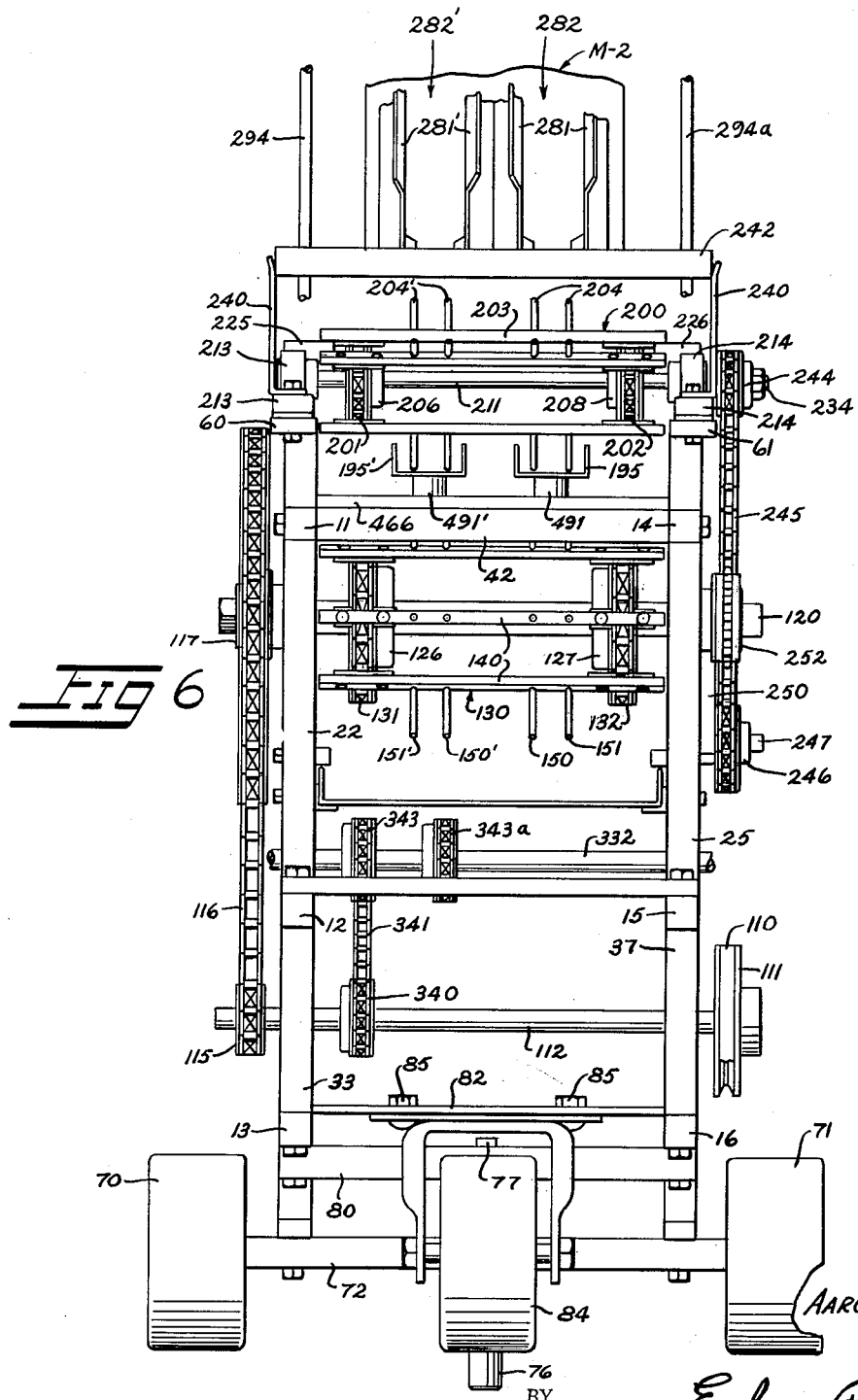

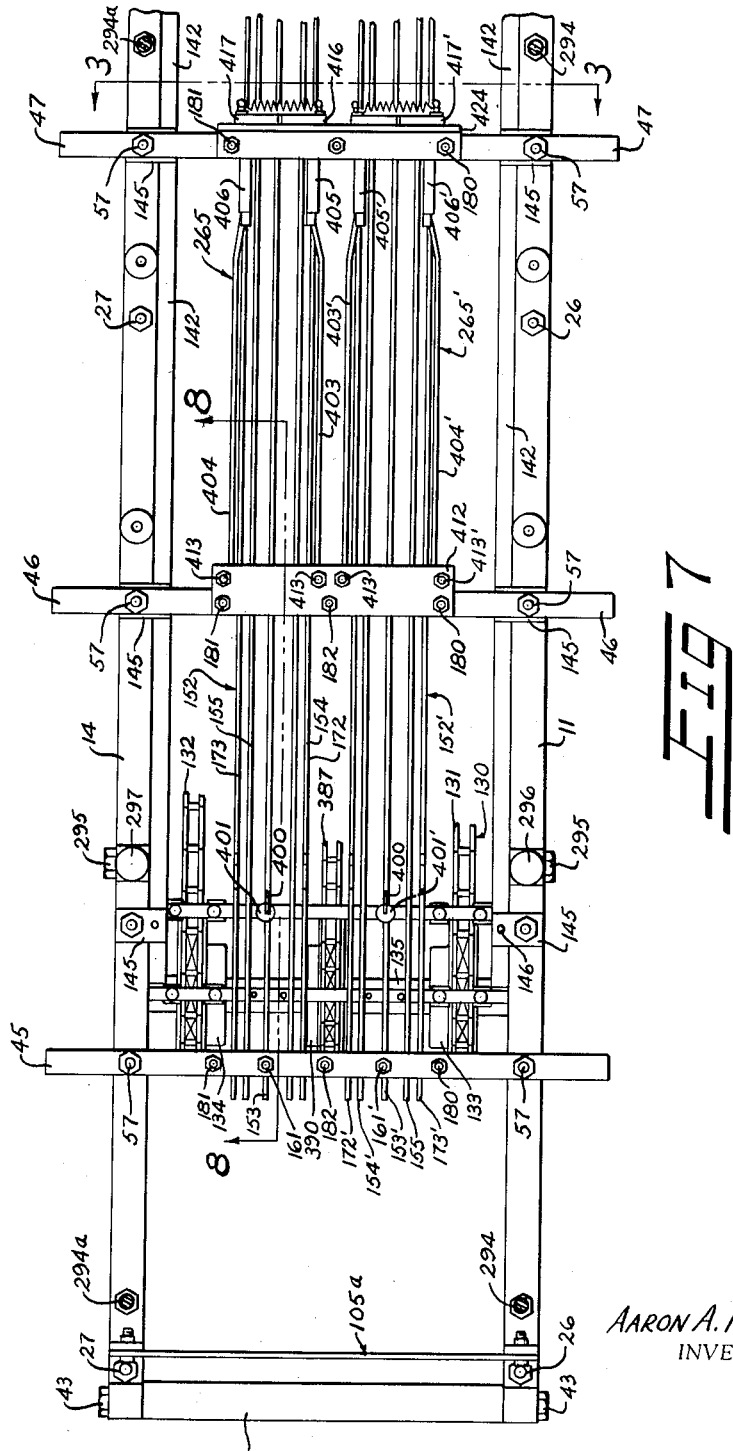

Nov. 8, 1955   A. A. KNEE   2,722,900
SANDWICH MAKING MACHINE
Filed July 13, 1951   16 Sheets-Sheet 7
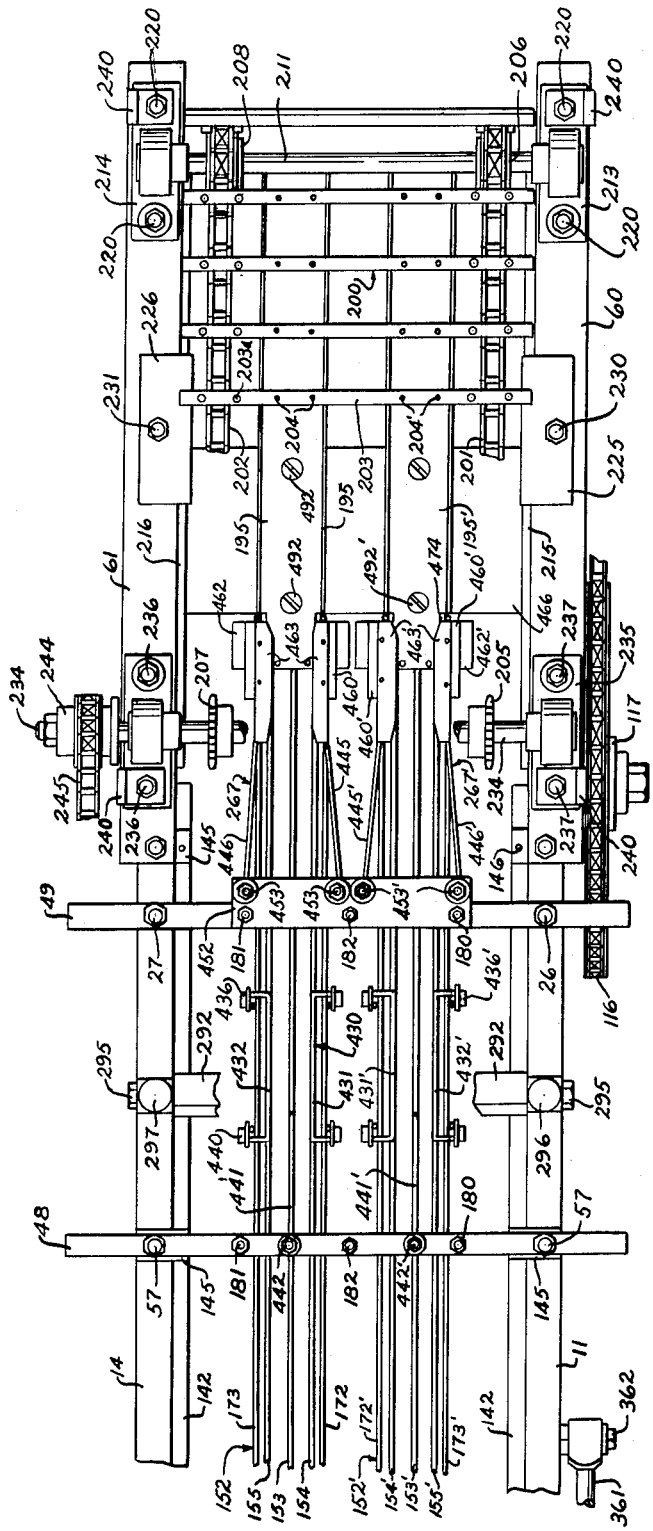
Fig 7-A
AARON A. KNEE:
INVENTOR.
BY *Eaton + Bell*
ATTORNEYS.

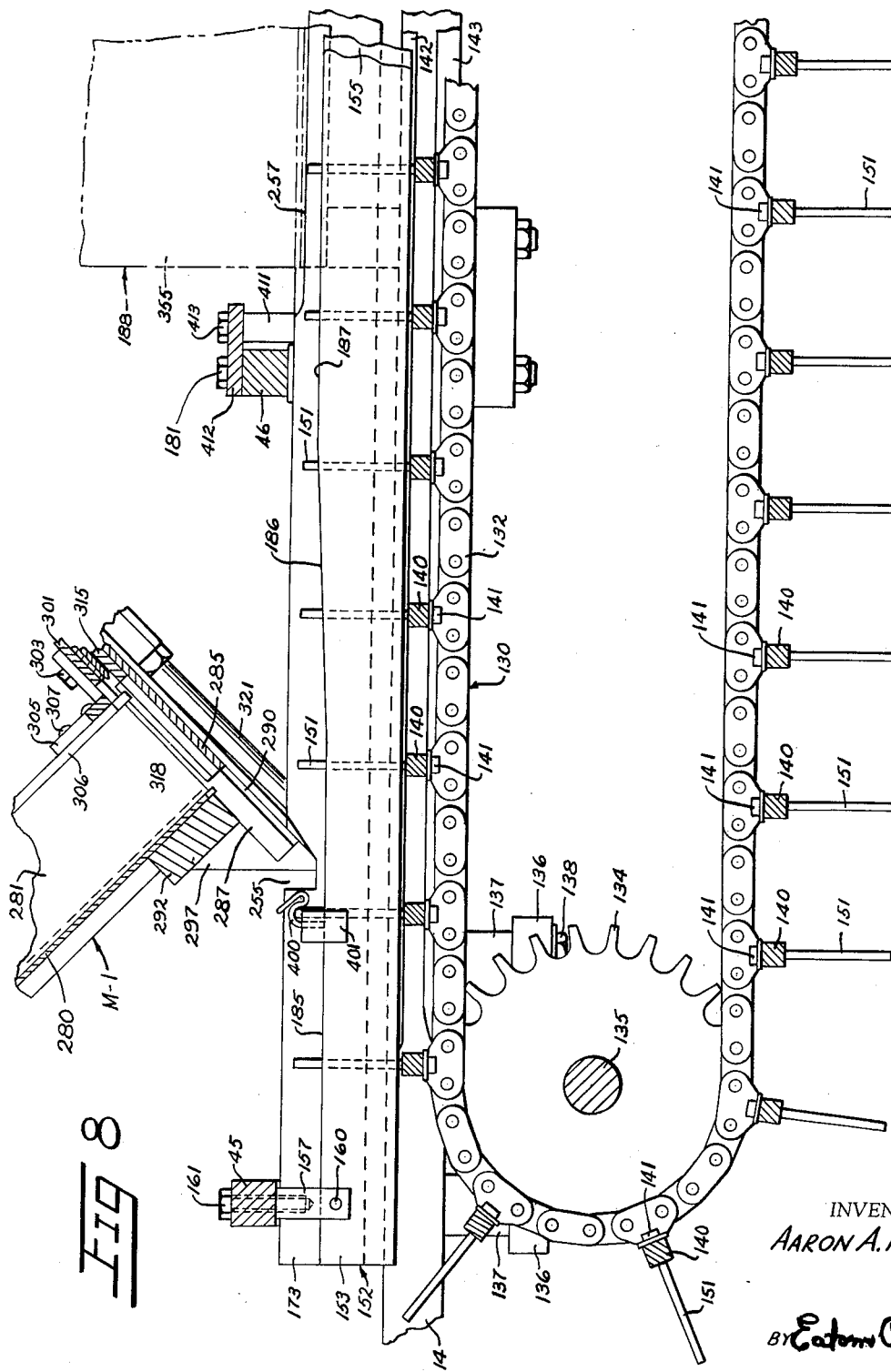

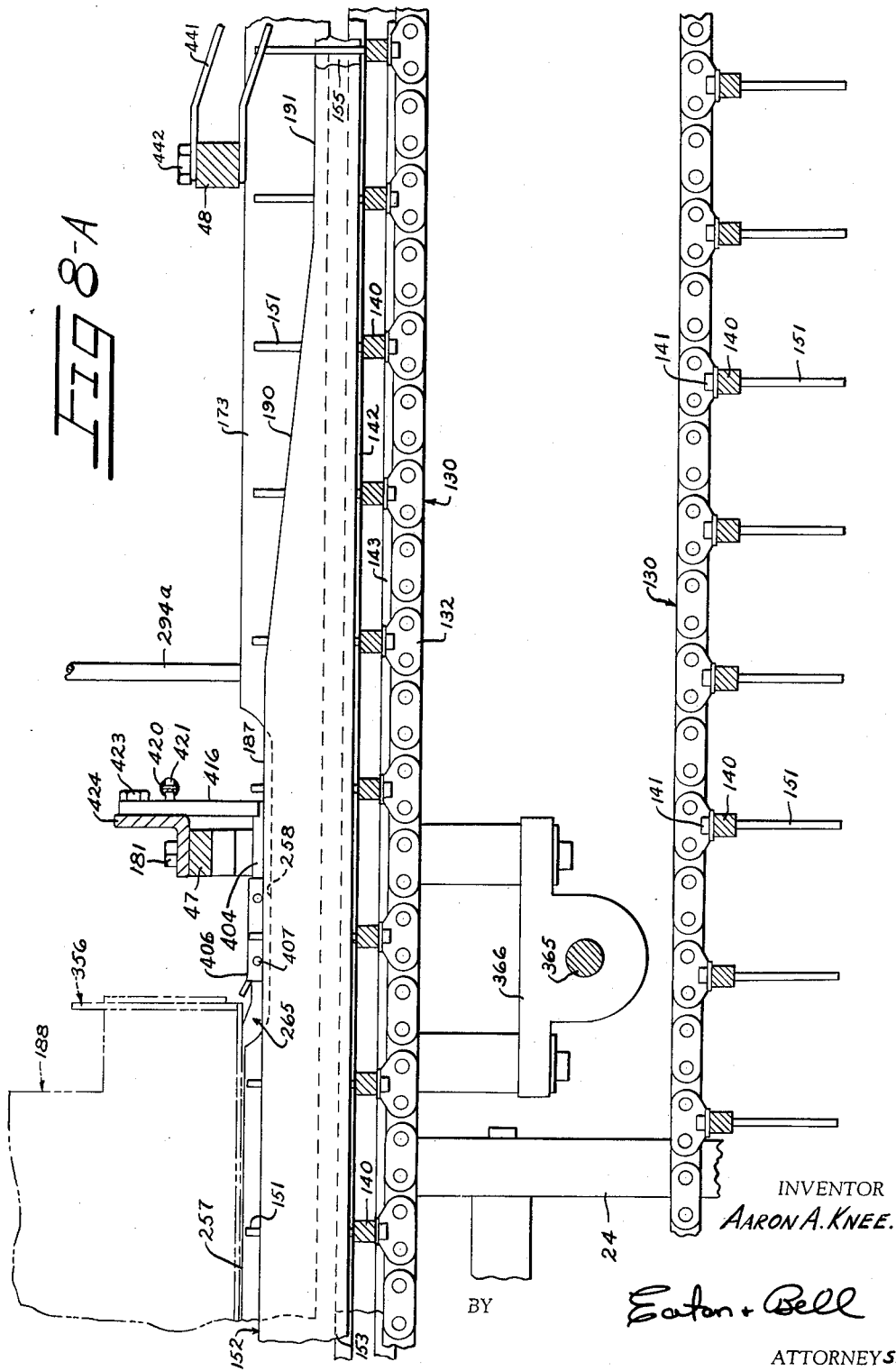

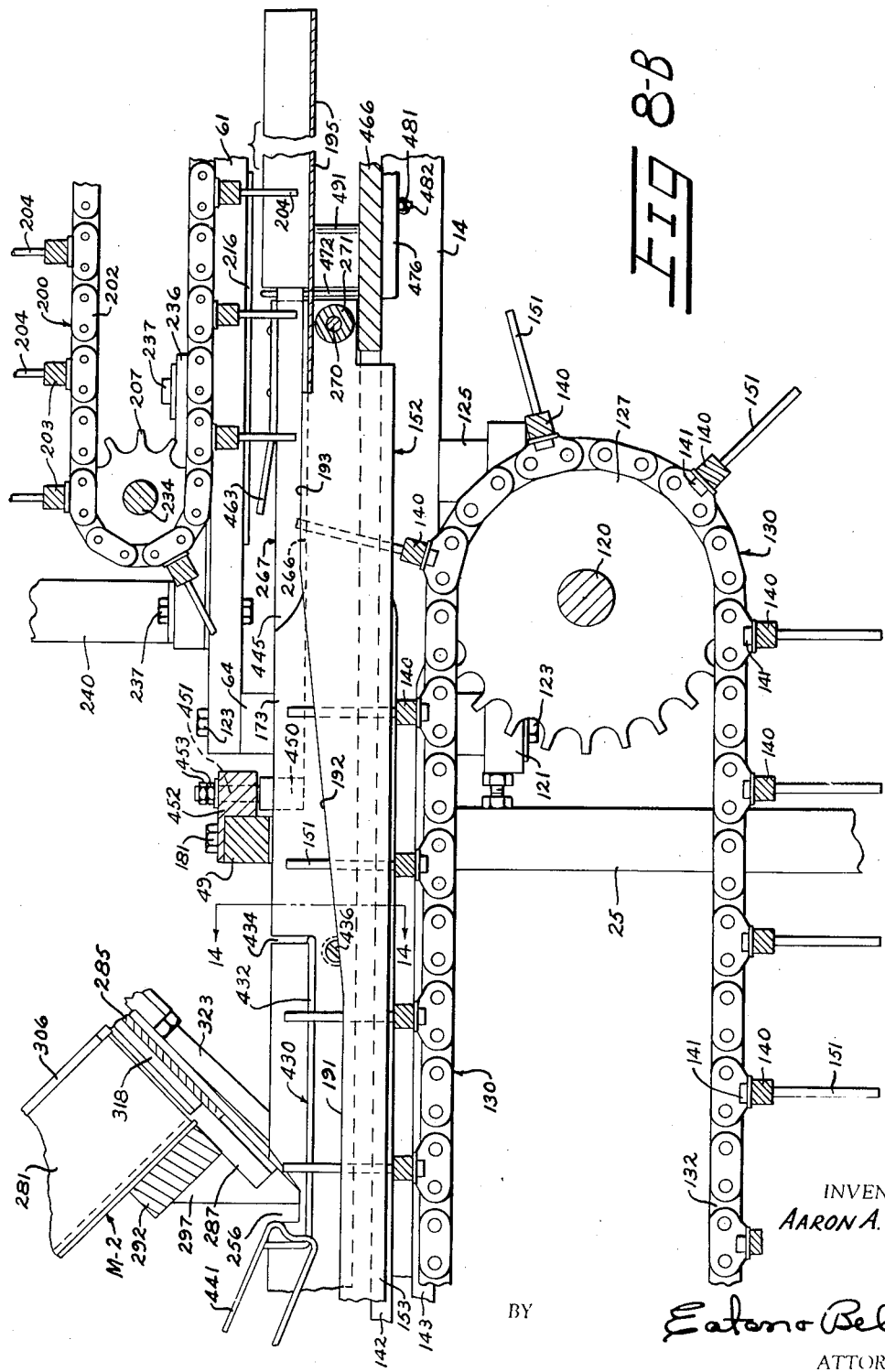

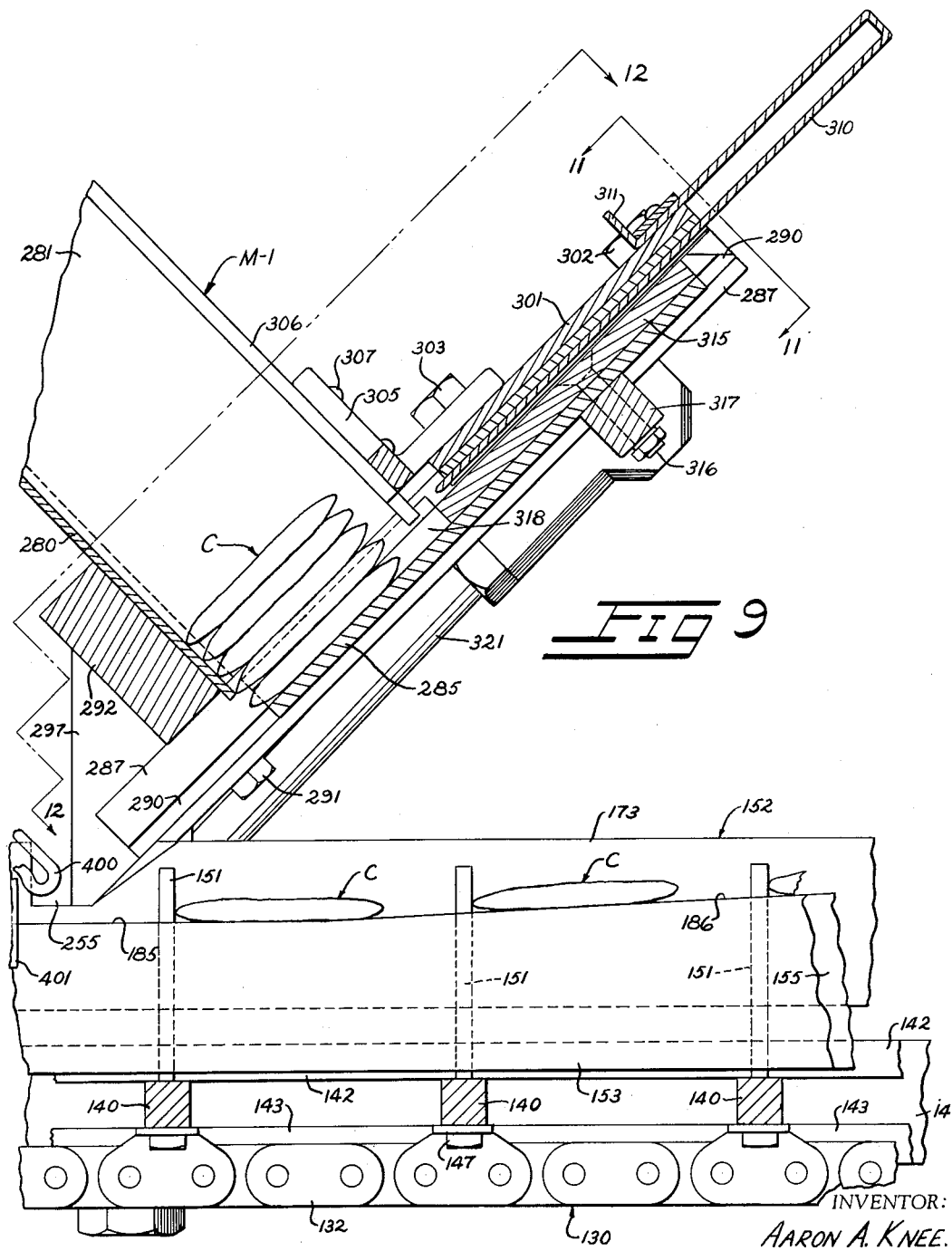

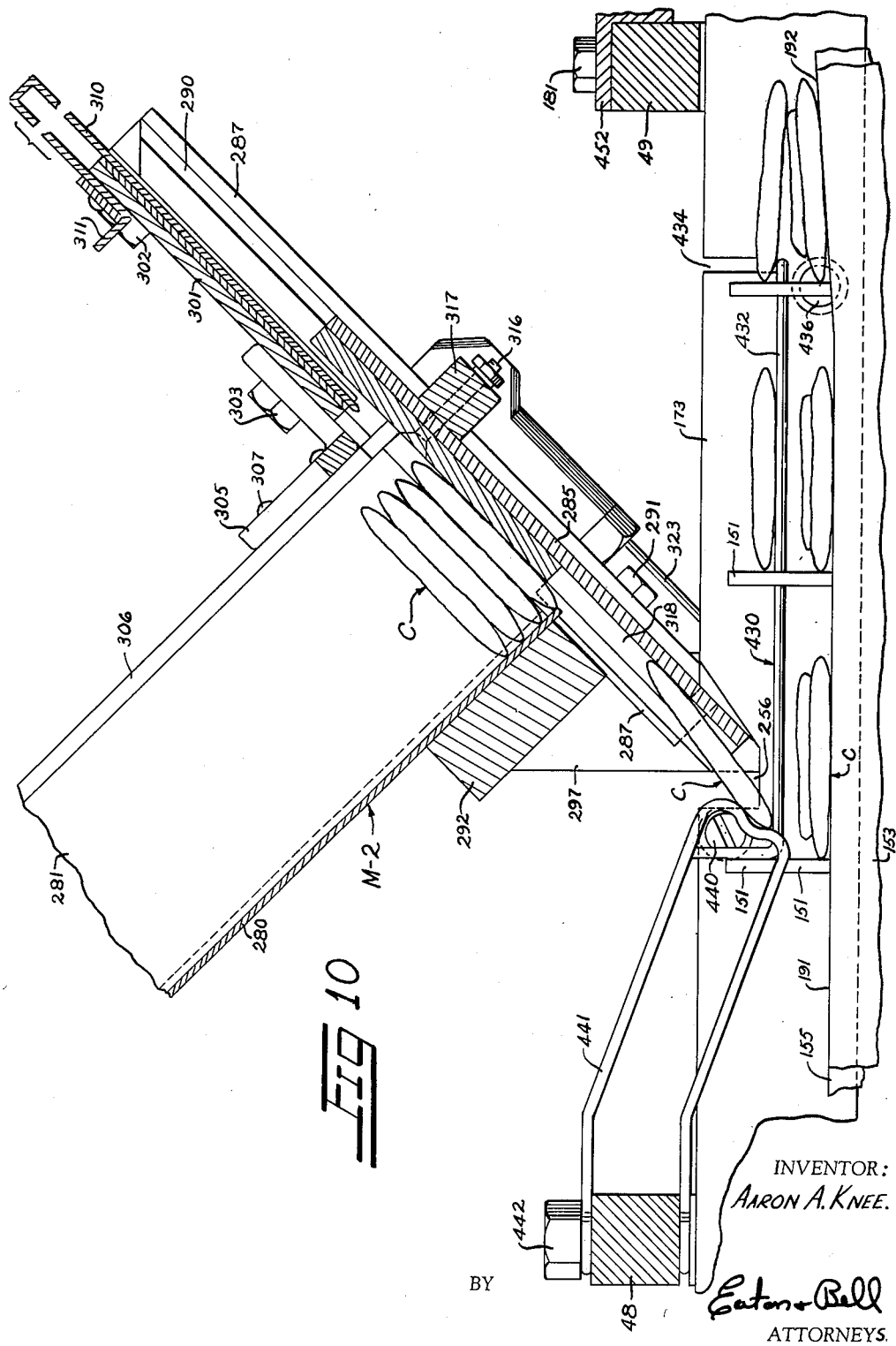

Nov. 8, 1955　　A. A. KNEE　　2,722,900
SANDWICH MAKING MACHINE
Filed July 13, 1951　　16 Sheets—Sheet 13

AARON A. KNEE,
INVENTOR.

BY Eaton + Bell
ATTORNEYS

Nov. 8, 1955
A. A. KNEE
2,722,900
SANDWICH MAKING MACHINE
Filed July 13, 1951
16 Sheets-Sheet 14
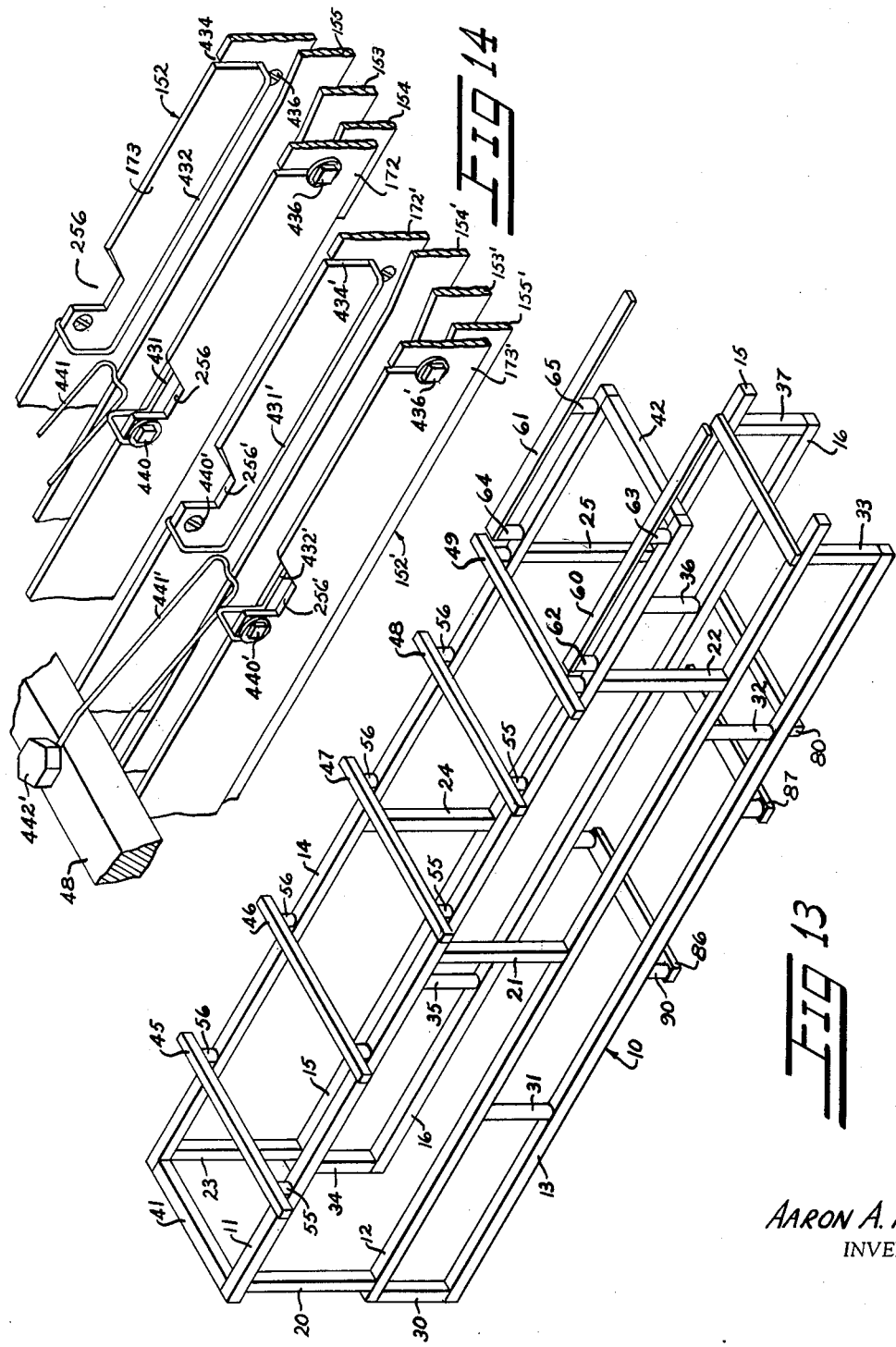
AARON A. KNEE:
INVENTOR.
BY Eaton+Bell
ATTORNEYS.

Nov. 8, 1955 A. A. KNEE 2,722,900
SANDWICH MAKING MACHINE
Filed July 13, 1951 16 Sheets-Sheet 15
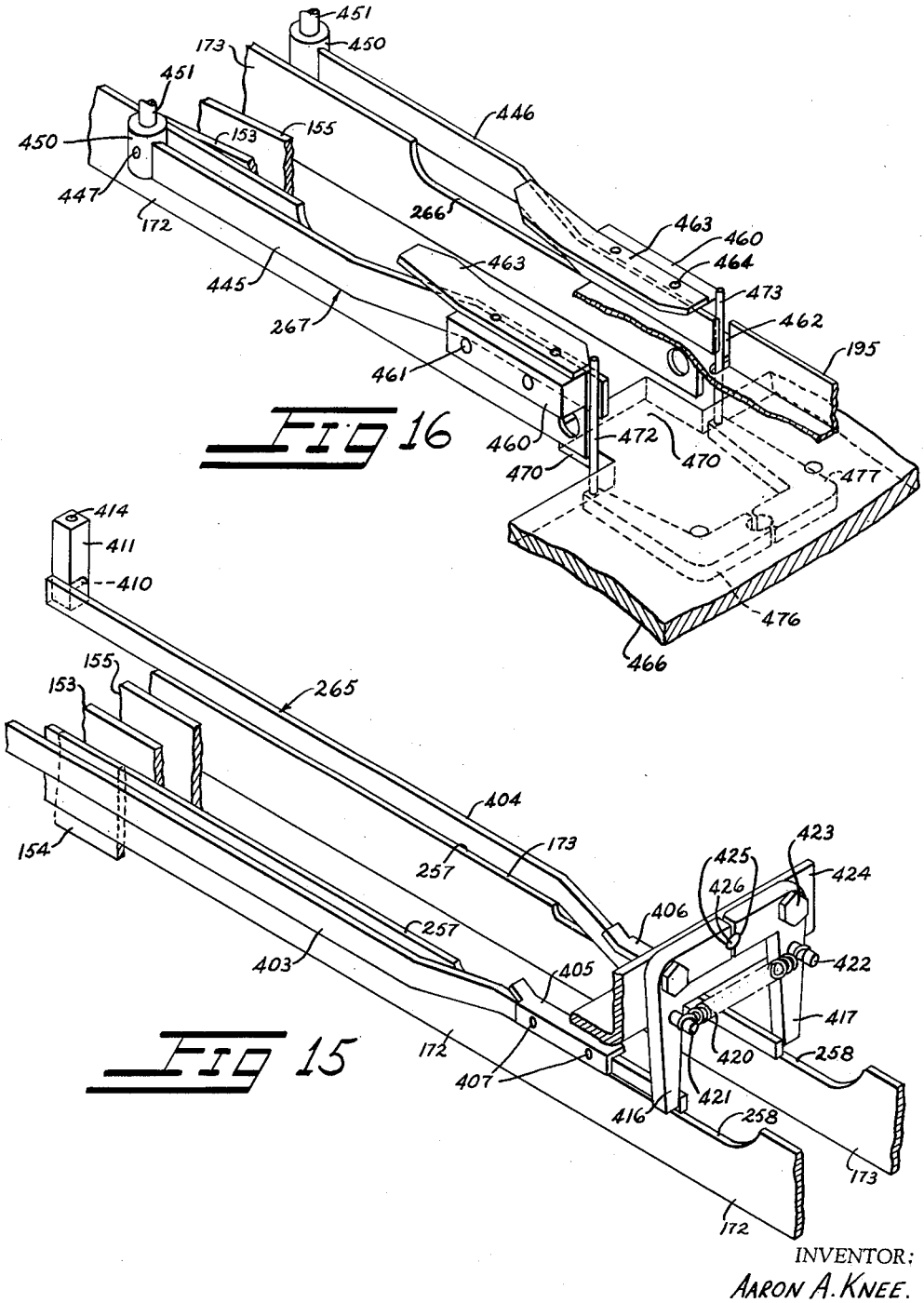
INVENTOR:
AARON A. KNEE.
BY
Eaton + Bell
ATTORNEYS

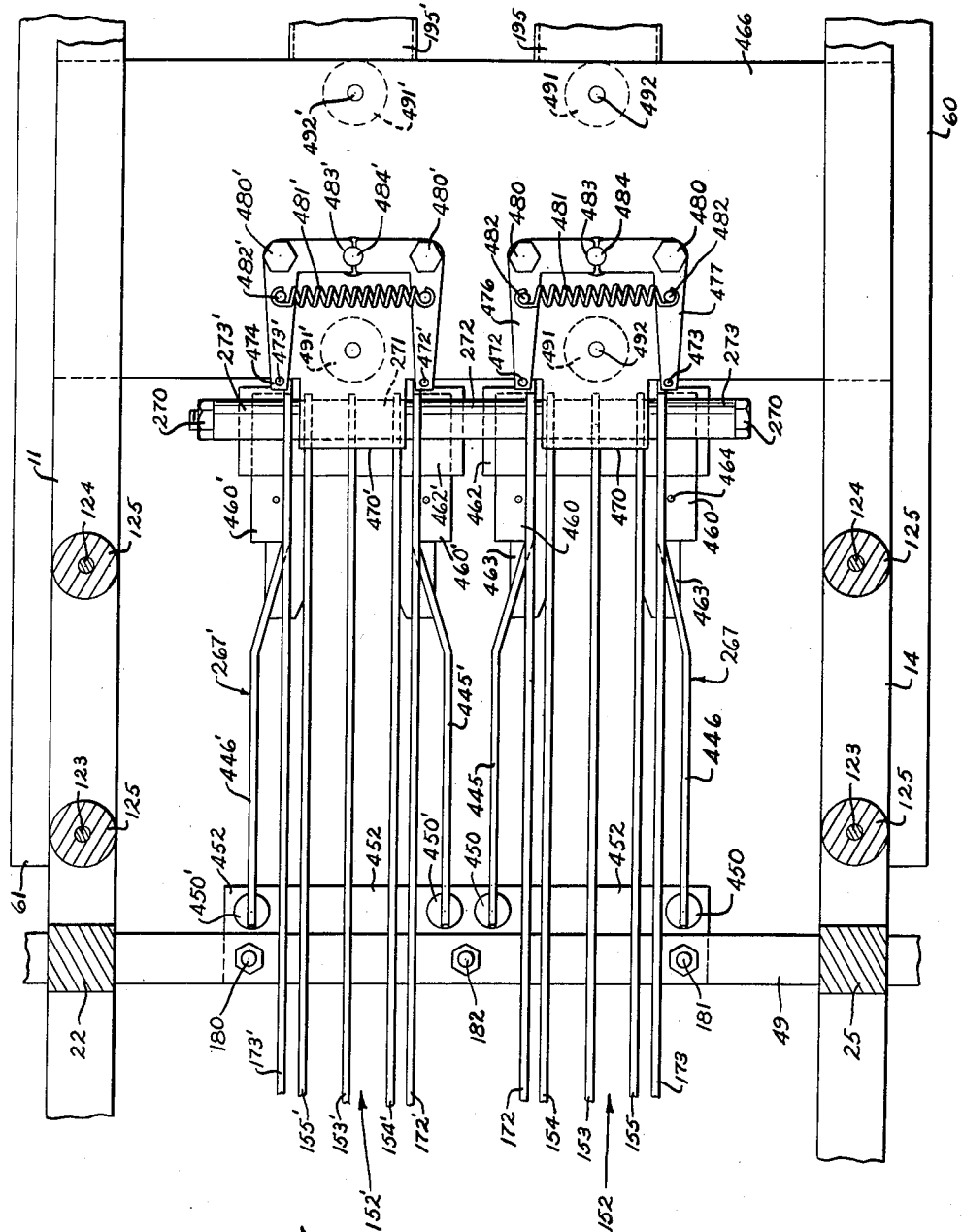

United States Patent Office 2,722,900
Patented Nov. 8, 1955

2,722,900

SANDWICH MAKING MACHINE

Aaron A. Knee, Charlotte, N. C., assignor to Lance, Inc., Charlotte, N. C., a corporation of North Carolina Application July 13, 1951, Serial No. 236,617

15 Claims. (Cl. 107—1)

This invention relates to sandwich making machines and more especially to an improved machine of the type having means for feeding a cracker or cake along predetermined paths, depositing a filler such as peanut butter and the like onto the cracker or cake, then depositing another cracker or cake atop the first-named cracker or cake and then delivering the finished product from the discharge end of the machine to a suitable conveying means for directing the same to a suitable packaging apparatus for packaging the double-decked crackers or cakes with the filler therebetween.

This invention is more particularly concerned with improvements in a machine of the type shown in my co-pending application, Serial No. 777,083, filed September 30, 1947, now Patent No. 2,603,341, dated July 15, 1952, and entitled Sandwich Making Machine.

It is the primary object of this invention to provide a machine of the type described which is more efficient in its operation, requires a lesser number of parts and, consequently, may be more economically constructed and maintained than machines of this type which have heretofore been manufactured. To this end, improved means are provided for feeding the crackers or cakes from a first magazine onto an improved trackway preparatory to the peanut butter or other filler being deposited thereon and then, following the depositing of the filler on the cracker, the cracker subsequently is moved along the said trackway and has another cracker positioned atop the same and an improved means is also provided for positioning the second cracker atop the first cracker as the second cracker is discharged from a second magazine.

It is another object of this invention to provide an improved sandwich making machine of the type described with improved trackways, each of which includes transversely spaced guide members extending longitudinally of the machine and between which are longitudinally extending tracks whose upper edges are generally disposed at a lower elevation than the upper edges of the guide members and also whose upper edges vary as to height throughout their lengths. The machine also includes an endless conveyor having pins projecting radially therefrom which pins pass between the tracks and the guides of each trackway and which pins project upwardly beyond the upper edges of the tracks as the upper reach of the conveyor moves longitudinally of said trackways.

The present invention differs materially from said co-pending application in that the pins of the endless conveyor remain at the same level throughout their movement longitudinally of the trackways while the tracks disposed between said guide members vary as to height so as to permit the crackers to move along a relatively low plane as they pass beneath the first and second magazines and to elevate the crackers so that they are disposed in closely spaced relation to the bottom of the dispensing means for the filler for the crackers as they pass therebeneath.

It is still another object of this invention to provide an improved magazine which is especially adapted for use with a sandwich making machine of the type described wherein the trackways are arranged in the manner described. The improved magazine is provided with inclined chutes in which the cakes or crackers are placed in juxtaposed relation to each other by an operator. This magazine is provided with a substantially vertically reciprocable discharge means including a plate normally spaced from the lower ends of the chutes and having another plate secured thereto and, upon a downward movement of the plates, the upper plate will move the cracker or cake disposed in its path downwardly to deposit the same upon the tracks which extend longitudinally of the machine.

At least one of the tracks is provided with a hooked member having its hook portion facing towards the direction towards which the crackers are moved by the pins on the endless conveyor and this hooked member overlaps the lower edge of the cracker as it is discharged from the corresponding magazine and thus insures that the crackers lay properly upon the corresponding portions of the tracks so as to be properly engaged by the pins on the endless conveyor as they move longitudinally of the trackways.

In the case of the second magazine, that is, the magazine having the crackers or cakes therein which are to be deposited upon the crackers from the first magazine, the guides for each trackway have improved support means projecting inwardly therefrom above the tracks onto which the corresponding crackers or cakes are deposited upon each downward movement of the discharge means associated with the second magazine and the pins on the endless conveyor project high enough above the corresponding portions of the tracks to slide the second cracker or cake along the upper surface of the support means while sliding a corresponding cracker from the first magazine below the support means and, whereby, upon the second crackers being slid off of the said second support means, the second cracker will move downwardly, by gravity, onto the upper surface of the filler which may have been deposited upon the cracker from the first magazine prior to this cracker being moved beneath the second magazine.

It is still another object of this invention to provide improved equalizer or centering means one of each of which is positioned rearwardly of the second magazine and the filler dispensing means. This equalizer means engages opposed side edges of the corresponding crackers or cakes to thus insure that the upper and lower crackers or cakes may be properly positioned relatively to each other. This also insures that the crackers or cakes will not become partially rotated as they move along the tracks, which would result in the crackers or cakes binding against the guides which are disposed at opposed sides of the crackers or cakes as they are moved longitudinally of the tracks.

Some of the objects of the invention having been stated, other objects will appear as the description proceeds when taken in connection with the accompanying drawings, in which—

Figure 1 is a left-hand side elevation of the improved sandwich making machine with some of the parts broken away;

Figure 2 is a top plan view looking down at the top of Figure 1 and also showing some of the parts broken away for purposes of clarity;

Figure 3 is an enlarged vertical sectional view showing one of the sets of equalizer means and is taken substantially along the line 3—3 in Figure 1;

Figure 4 is a right-hand side elevation of the machine looking at the opposite side from that shown in Figure 1 with some of the parts broken away;

Figure 5 is an enlarged rear end elevation with parts broken away looking at the left-hand side of Figure 1 with the upper portion thereof broken away;

Figure 6 is an enlarged front or discharge end elevation of the machine looking at the right-hand side of Figure 1 with the upper portion thereof broken away;

Figure 7 is an enlarged partial top plan view of the machine looking at the top of the left-hand portion of Figure 1 but omitting the left-hand or first magazine and the dispensing mechanism for the filler;

Figures 11, 12:
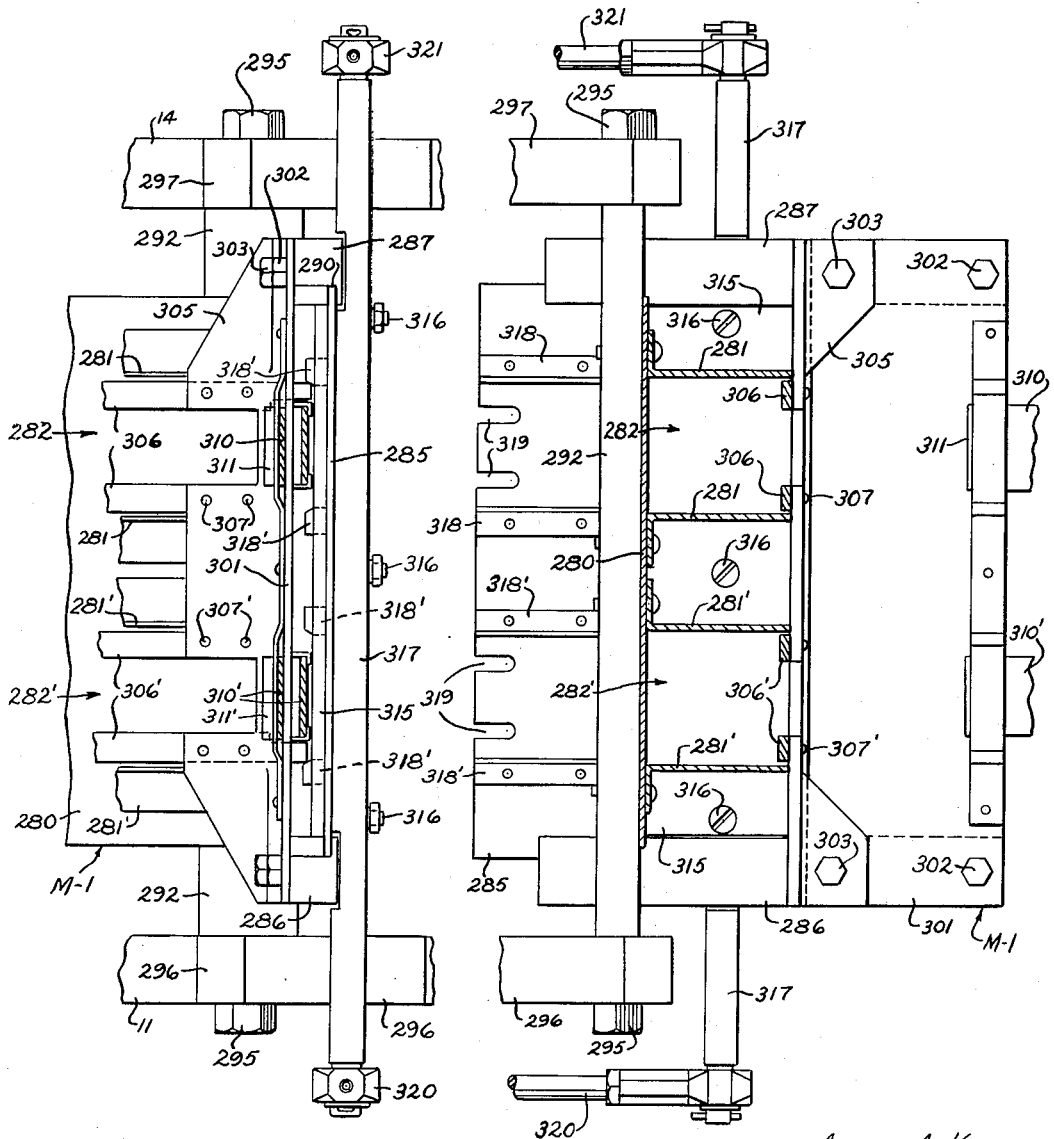

Figure 7-A is an extension to the right-hand end of Figure 7 and looking down at the right-hand portion of Figure 1 but omitting the second magazine;

Figure 8 is an enlarged fragmentary vertical sectional view taken substantially along the line 8—8 in Figure 7 but showing the lower portion of the first magazine in association therewith and also showing a portion of the filler dispensing mechanism in association therewith;

Figure 8-A is an extension to the right-hand end of Figure 8;

Figure 8-B is an extension to the right-hand end of Figure 8-A with parts broken away and others of the parts being shown in cross-section;

Figure 9 is an enlarged fragmentary vertical sectional view of the upper central portion of Figure 8 and showing the discharge mechanism for the magazine in a different position;

Figure 10 is an enlarged detail view showing the discharge end of the second magazine in association with the corresponding trackway, this view being similar to the upper left-hand portion of Figure 8-B;

Figure 11 is a fragmentary sectional plan view of the second magazine taken substantially along the line 11—11 in Figure 9;

Figure 12 is a fragmentary elevation with parts in section taken substantially along the line 12—12 in Figure 9 but showing the cake retaining plate 285 in a different position;

Figure 13 is an isometric view showing the frame of the machine with the various movable parts omitted therefrom;

Figure 14 is a fragmentary isometric view, with parts in section and other parts being broken away, taken substantially along the line 14—14 in Figure 8-B, but omitting the magazine for purposes of clarity;

Figure 15 is an enlarged, schematic isometric view of one of the cake equalizer or centering units shown in the right-hand portion of Figure 7;

Figure 16 is an enlarged, schematic isometric view of one of the sandwich equalizer or centering units shown in the central portion of Figure 7-A;

Figure 17 is an enlarged inverted plan view, with parts in section, taken substantially along the line 17—17 in Figure 1.

Referring more specifically to the drawings, the numeral 10 broadly designates the frame of the machine which comprises longitudinally extending vertically spaced side frame members or bars 11, 12 and 13 disposed at the left-hand side of the machine and vertically spaced longitudinally extending right-hand side frame members or bars 14, 15 and 16 which are disposed at the same levels as the respective bars 11, 12 and 13. The upper longitudinally extending frame members 11 and 13 are held in properly spaced relation to the intermediate longitudinally extending frame members 12 and 15 by longitudinally spaced vertically disposed bars 20, 21 and 22 and 23, 24 and 25, respectively.

The frame members 20 to 22, inclusive, are suitably secured to the upper and intermediate corresponding longitudinally extending frame members 11 and 12, as by screws 26. The bars 23, 24 and 25 are secured at opposed ends thereof to the corresponding longitudinally extending bars 14 and 15 by any suitable means such as screws 27. Referring again to Figure 13, it will be observed that the longitudinally extending intermediate frame meembers or bars 12 and 13 are supported in spaced relation to the corresponding lower frame members 13 and 16 by longitudinally spaced vertically disposed bars 30 to 33, inclusive, and 34 to 37, inclusive, respectively, which are secured at opposed ends thereof to the corresponding longitudinally extending frame members 12 and 13 and 15 and 16 by any suitable means such as screws 40.

The opposed ends of the upper longitudinally extending frame members 11 and 14 have opposed ends of respective rear and front transverse frame members or bars 41 and 42 suitably secured thereto as by screws 43. The upper frame members 11 and 14 are also spanned by a plurality of longitudinally spaced intermediate transverse bars, there being five of these transverse bars indicated at 45 to 49, inclusive. These bars 45 to 49, inclusive, are spaced above the upper surfaces of the longitudinally extending upper frame members 11 and 14, by spacing members 55 and 56, and also extend substantially beyond opposed sides of the frame 10 for depending a suitable skirting, not shown, therefrom. The bars 45 to 48, inclusive, are secured to the upper surfaces of the corresponding frame members 11 and 14 by any suitable means such as screws 57.

The transverse bar 49 is secured to the upper surfaces of the longitudinally extending frame members 11 and 14 by the screws 26 and 27 which secure the upper ends of the corresponding vertically disposed frame members 22 and 25 to the lower surfaces of the frame members 11 and 14. These last-named screws 27 slidably penetrate the corresponding spacing members 55 and 56 as well as the frame members 11 and 14 and are threadably embedded in the upper ends of the vertically disposed frame members 22 and 25. The screws 57 slidably penetrate the corresponding bars 45 to 48, inclusive, and the spacing members 55 and 56 and are threadably embedded in the longitudinally extending frame members 11 and 14.

The transverse bar 49 is spaced substantially rearwardly of the front end of the frame 10 and there is disposed forwardly of this transverse bar 49, a pair of longitudinally extending ejector unit support bars 60 and 61 which are spaced above the corresponding longitudinally extending frame members 11 and 14 by suitable spacing members 62, 63 and 64, 65. The bars 60 and 61 are secured to the upper surfaces of the frame members 11 and 14 in a manner to be later described.

Referring to Figures 1, 4 and 5, it will be observed that the frame 10 is supported by ground wheels 70 and 71 which are rotatably mounted on an axle 72 suitably secured, as by screws 73, to the lower surfaces of spacing members 74 and 75 which are, in turn, secured to the lower surfaces of the respective longitudinally extending lower frame members 13 and 16. The front or discharge end of the frame 10 is supported on a centrally disposed leg 76 which extends upwardly and is suitably secured, as by a screw 77 (Figure 6) to the lower surface of a transverse bar 80 which is secured at opposed ends thereof to the lower surfaces of the longitudinally extending frame members 13 and 16 by the same screws 40 which are employed in securing the lower ends of the vertically disposed frame members 32 and 36 to the upper surfaces of the longitudinally extending frame members 13 and 16.

The longitudinally extending lower frame members 13 and 16 also support opposed sides of a horizontally disposed caster support plate 82 which is secured thereto, as by screws 83, and to the lower surface of which a swivel-type caster 84 is suitably secured, as by bolts 85. It is thus seen that the leveling leg 76 may be removed and the front end of the frame 10 supported by the caster 84 for moving the improved sandwich machine from one place to another.

The longitudinally extending lower frame members 13 and 16 are spanned by transverse bars 86 and 87 which are spaced from the lower surfaces of the frame members 13 and 16 by spacing members 90, the spacing members 90 and the bars 86 and 87 being penetrated by bolts 91 for securing the same to the frame members 13 and 16 of the frame 10. The transverse bars 86 and 87 support the rear and front ends, respectively, of motor support bars 92 and 93 which are secured to the transverse bars 86 and 87 by any suitable means, such as screws 95, (Figure 5).

The motor support bars 92 and 93 have an electric motor or variable speed device 96 suitably secured thereto, as by screws 97. The motor 96 has electric wires 98 and 99 extending therefrom which may extend through a suitable switch box 105 (Figures 1 and 4) and thence to a suitable source of electrical energy, not shown. The switch box 105 is supported on a suitable frame 105 secured to the frame 10 by the screws 26 and 27.

The motor 96 has a shaft 106 extending therefrom on which a V-pulley 107 is fixedly mounted. The V-pulley 107 has a V-belt 110 mounted thereon which is also mounted on a V-pulley 111 (Figure 4). The V-pulley 111 is fixedly mounted on a shaft 112 which is rotatably mounted in bearing blocks 113 suitably secured, as by bolts 114, to the vertically disposed front frame members 33 and 37.

Referring to Figure 1, it will be observed that the end of the shaft 112, remote from the end on which the V-pulley 111 is fixedly mounted, has a sprocket wheel 115 fixedly mounted thereon on which a sprocket chain 116 is mounted. The sprocket chain 116 extends upwardly and is mounted on a sprocket wheel 117 which is of a substantially greater diameter than the sprocket wheel 115 and which is fixedly mounted on a transverse drive shaft 120. The shaft 120 is rotatably mounted in bearing blocks 121 which are suitably secured, as by bolts 123 and 124, to the lower ends of suitable spacing members of spacers 125 which are, in turn, secured to the lower surfaces of the longitudinally extending frame members 11 and 14 by these bolts 123 and 124.

It will be observed, in Figures 1 and 4, that the bolts 123 not only serve to secure the rear ends of the bearing blocks 121 to the lower surfaces of the spacing members 125 and the longitudinally extending frame members 11 and 14 but these bolts also serve to secure the spacers 62 and 64 and the corresponding ends of the longitudinally extending ejector unit support bars 60 and 61 to the corresponding longitudinally extending frame members 11 and 14.

Referring to Figures 4, 6 and 8, it will be observed that the drive shaft 120 has longitudinally spaced main conveyor sprocket wheels 126 and 127 fixedly mounted thereon which are parts of a main endless conveyor broadly designated at 130. The sprocket wheels 126 and 127 have respective carrier sprocket chains 131 and 132 mounted thereon which extend substantially the full length of the machine and are also mounted on respective sprocket wheels 133 and 134 which are fixedly mounted on a transverse shaft 135.

The transverse shaft 135 is rotatably mounted in bearing blocks 136 (Figures 1 and 4). The bearing blocks 136 are secured to the lower ends of spacing members 137 which are, in turn, secured to the lower surfaces of the longitudinally extending upper frame members 11 and 14 by any suitable means, such as screws 138, which penetrate the bearing blocks 136 and also penetrate the spacing members 137 and are threadably embedded in the longitudinally extending frame members 11 and 14.

Certain spaced links of the carrier sprocket chains 131 and 132 have opposed end portions of main conveyor bars 140 suitably secured thereto, as by bolts 141, there being special links provided to accommodate the bolts 141. The bars 140 span the sprocket chains 131 and 132 and the opposed end portions of the bars 140 in the upper reaches of the carrier sprocket chains 131 and 132 are caused to move along in a straight path in parallel relation to the longitudinally extending frame members 11 and 14 by upper and lower respective guide bars 142 and 143 (Figure 3) which extend substantially the length of the respective longitudinally extending frame members 11 and 14 but opposed ends of which terminate short of the sprocket wheels 126, 127 and 133, 134 at opposed ends of the main conveyor 130.

The opposed ends of the bars 140 move in sliding engagement with the upper and lower guide bars 142 and 143, as shown in Figure 3, as the bars 140 move with the upper reach of the endless conveyor 130. The bars 143 are suitably secured, as by bolts 144, to the proximate surfaces of the longitudinally extending frame members 11 and 14 and the bars 142 are held against the proximate surfaces of the longitudinally extending frame members 11 and 14 by means of clips or supports 145 to which they are secured by any suitable means, such as rivets 146.

The supports 145 are suitably secured to the upper surfaces of the longitudinally extending frame members 11 and 14, as by screws 147, at the rear portion of the machine and the supports 145 are secured to the upper surfaces of the longitudinally extending frame members 11 and 16 adjacent the front end of the machine by the bolts 123 which serve to secure the bearing blocks 121 and the ejector unit support bars 60 and 61 to the frame members 11 and 14. The intermediate supports 145 for the bars 142 are secured to the upper surfaces of the longitudinally extending frame members 11 and 14 by the screws 57 which serve to secure the transverse bars 46 and 48 to the frame members 11 and 14 (Figures 1 and 13).

Fixedly mounted in each of the bars 140 and extending radially therefrom are two pairs of relatively closely spaced main conveyor pins or prongs 150, 151 and 150', 151'. As the pins 150 and 151 move with the upper reaches of the conveyor carrier chains 131 and 132, they move along a trackway broadly designated at 152 while the pins 150' and 151' move along a trackway broadly designated at 152'.

Since the trackways 152 and 152' are identical, only the trackway 152 will be described in detail and those parts of the trackway 152' which are identical to the parts associated with the trackway 152 will bear the same reference characters with the prime notation added.

The trackway 152 comprises a middle track 153 and outside tracks 154 and 155 which extend longitudinally of the machine, the outside tracks 154 and 155 being spaced from the middle track 153. It will be observed in Figure 3 that the outside tracks 154 and 155 are spaced so the pins 150 and 151 of the main conveyor 130 move past the tracks 154 and 155 in closely spaced relation to the proximate surfaces thereof. It will be observed in Figure 8 that the rear end of the middle track 153 is supported in the lower bifurcated end of a vertically disposed support pin or rod 157 to which the middle track 153 is secured, as by a rivet 160. This support rod 157 extends upwardly and its upper end is secured to the lower surface of the transverse bar 45 by any suitable means such as a screw 161. The manner in which the front end of the middle track 153 is supported will be later described.

Each of the transverse bars 45 to 49, inclusive, has three track hanger members suitably secured thereto and depending therefrom, the outermost members being L-shaped and being indicated at 165 and 166 and the centermost or intermediate track hanger being substantially inverted T-shaped and indicated at 167. It is evident that, in the event of more than two trackways being provided, such as the trackways 152 and 152', it will be necessary to provide additional intermediate track hangers, such as the track hanger 167 in Figure 3.

The outermost tracks 154 and 155 are secured to the proximate sides of the track hangers 167 and 166, by any suitable means, such as bolts 170, the outside tracks 154' and 155' being secured to the proximate surfaces of the track hangers 165 and 167 by any suitable means such as bolts 170'.

Longitudinally extending trackway guides 172 and 173 are secured to but spaced from the remote vertical surfaces of the tracks 154 and 155 by any suitable means such as bolts 174 which bolts slidably penetrate suitable spacing collars or sleeves 175 disposed between the proximate surfaces of the respective tracks 154 and 155 and the trackway guides 172 and 173. The upper edges of the trackway guides 172 and 173 are generally disposed at higher elevations than the upper edges of the relatively thin tracks 153 to 155, inclusive.

The upper edges of the tracks 153, 154 and 155 are of identical configuration throughout their length. This is most clearly shown in Figures 8, 8–A and 8–B. The configuration of the upper edges of the tracks 153, 154 and 155, and the trackway guides 172 and 173 and the structure of the main conveyor 130 embody the most important features of the present invention.

In this instance, the track hangers 165, 166 and 167 are secured to the lower surface of each of the transverse bars 145 to 149, inclusive, by any suitable means such as screws 180, 181 and 182, respectively, (Figures 7 and 7–A).

Referring to Figure 8, it will be observed that the upper edge of each of the longitudinally extending tracks 153, 154 and 155, at the rear end of the machine, has a relatively low surface 185 which is disposed at a substantially lower level than the upper edge of the adjacent trackway guides 172 and 173. This is necessary because of the relative height of the pins 151 and 152 which are moving along with the upper reach of the main conveyor 130 from left to right in Figure 8 and also because of the position of a first magazine broadly designated at M–1 which will be later described in detail.

This magazine M–1 deposits the crackers one at a time upon the edge 185 of each of the tracks 153, 154 and 155 so the next adjacent pins 150 and 151 on the main conveyor 130 will push the cracker or the cake sliding the same along the upper edges 185 of the tracks 153, 154 and 155. The tracks 153, 154 and 155 are then each provided with an inclined upper edge 186 which causes the crackers, cakes or the like to move upwardly and forwardly to an upper edge portion 187 on each of the tracks 153, 154 and 155. This causes the crackers or cakes to assume a position closely adjacent the upper ends of the pins 150 and 151 and thus permits the pins to pass beneath a suitable dispensing mechanism which is shown in the form of a gear pump broadly designated at 188. This dispensing mechanism may be identical to the dispensing mechanism shown in my said co-pending application and a detailed description thereof is thus deemed unnecessary.

As is clearly set forth in my said co-pending application, the gear pump 188 is driven to intermittently emit a filler, such as peanut butter or the like, onto each of the crackers which are disposed between adjacent sets of the pins 150 and 151 and the relatively high surface 187 is provided on each of the tracks 153, 154 and 155 to thus present the upper surface of the cracker passing in engagement therewith to a position closely adjacent the discharge opening in the discharge portion of the pump 188.

It will be observed in Figure 8–A that the relatively high surface or edge 187 on each of the tracks 153, 154 and 155 extends substantially beyond the discharge or front end of the gear pump 188 and the upper edge of each of the tracks 153, 154 and 155 is then inclined downwardly and forwardly, as at 190, to thus cause the crackers, cakes or the like to move downwardly in engagement with the corresponding conveyor pins 150 and 151 to engage a relatively low upper edge 191 on each of the tracks 153, 154 and 155. It will be noted that this edge or surface 191 is disposed in a lower horizontal plane than the edge 185 on each of the tracks 153, 154 and 155 because this edge 191 supports a cracker or cake onto which another cracker or cake is to be deposited from a magazine broadly designated at M–2. This second magazine M–2 is disposed in the same horizontal plane as the magazine M–1 and, therefore, the portion 191 of the upper edge of each of the tracks 153, 154 and 155 must be disposed at a substantially lower elevation than the edge 185.

It is necessary that both of the magazines M–1 and M–2 are disposed at the same elevation because of the upper ends of pins 150 and 151 being disposed at substantially the same elevation throughout their path of movement between the tracks 154 and 155.

The manner in which the second cracker or cake is directed from the second magazine M–2 so as to be properly positioned atop the filler on the first cracker between successive sets of pins 150 and 151 will be later described. The surface 191 on each of the tracks 153, 154 and 155 extends in a substantially horizontal plane to a point beyond the discharge end of the magazine M–2 and the tracks 153, 154 and 155, each has an upwardly and forwardly inclined upper surface or edge 192 which causes the crackers to be elevated as they are moved along by the corresponding pins 150 and 151 to a relatively high upper edge portion 193 on each of the tracks 153, 154 and 155. The upwardly and forwardly inclined surface 192 on each of the tracks 153, 154 and 155 is provided to assist in properly positioning the second cracker or cake upon the first cracker or cake as will be more fully described later in this context.

The surface 193 is provided so as to properly direct the sandwiches thus formed between equalizing or cake centering members, to be later described, and then onto a channel-shaped discharge chute 195, there being a similar channel-shaped discharge chute 195' associated with the trackway 152'. The surface 193 also directs the finished sandwiches upwardly to where they will be engaged by pins, to be presently described, projecting from an ejector conveyor broadly designated at 200.

The ejector conveyor 200 is constructed in a manner similar to that of the main conveyor 130 but is disposed at a higher elevation than the main conveyor so that the pins thereon, to be presently described, engage the sandwiches and move them along the upper surfaces of the channel-shaped chutes 195 and 195' as the pins move with the lower reach of the conveyor 200.

This ejector conveyor 200 comprises a pair of endless sprocket chains 201 and 202 which are spanned by ejector pin carrying bars 203, opposed end portions of which are suitably secured, as by screws 204, to certain spaced special links on the sprocket chains 201 and 202 as is clearly shown in Figure 7–A. The sprocket chain 201 is mounted on sprocket wheels 205 and 206 and the sprocket chain 202 is mounted on sprocket wheels 207 and 208. The sprocket wheels 206 and 208 are fixedly mounted on an idler shaft 211, opposed ends of which are rotatably mounted in bearing blocks 213 and 214 which are secured to the upper surfaces of respective longitudinally extending ejector unit support bars 60 and 61 at the front ends thereof by any suitable means such as bolts 220.

Plates 215, 216 are secured at their rear ends to the lower surfaces of the respective bars 60, 61 by the rearmost bolts 220 and project inwardly of the proximate edges of the bars 60 and 61 so as to support opposed ends of the transverse ejector pin carrying bars 203 as they move rearwardly with the lower reaches of the sprocket chains 201 and 202. This not only insures that the lower ends of the pins 204, 204' are disposed closely adjacent the upper surfaces of the corresponding channel-shaped chutes 195 and 195' and that the lower ends of the pins 204 and 204' will not rub against the upper surfaces of the corresponding chutes 195 and 195', but also insures that these pins will not pass above the sandwiches which have been directed to the chutes 195 and 195'.

It will be observed in Figures 1 and 4 that there is disposed above the spacers 63 and 65 (Figure 13) suitable respective spacing members 223 and 224 to the upper ends of which corresponding upper reach supporting plates 225 and 226 are secured, these plates 225 and 226 being bent downwardly at their front and rear ends so as to support the medial portion of the upper reach of the ejector conveyor 200, since the opposed ends of the bars 203 which are disposed substantially halfway between the sprocket wheels 205 and 206 will ride over the corresponding plates 225 and 226 and in sliding engagement therewith. The plate 225 is secured to the spacer 223 and the ejector support frame member 60 by a bolt 230 which also serves to secure the bar 60, the plate 215, and the spacer 63 to the longitudinally extending frame member 11. The plate 226 is also penetrated by a bolt 231 which serves to secure the plate 226, the spacer 224, the plate 216, the bar 61, the spacer 65 and the longitudinally extending frame member 14 together.

Now, referring again to Figure 7–A, it will be observed that the sprocket wheels 205 and 207 are fixedly mounted on a transverse shaft 234 which is rotatably mounted in bearing blocks 235 and 236 secured to the upper surfaces of the longitudinally extending ejector unit support bars 60 and 61 by any suitable means, such as screws 237.

Referring to Figures 1, 4 and 7–A, it will be observed that the foremost bolts 237 secure the rear ends of the plates 215, 216 to the bars 60, 61. The rearmost bolts 237 associated with the bearing blocks 235 and 236 and the foremost bolts 220 associated with the bearing blocks 213 and 214 support substantially L-shaped brackets 240 which extend upwardly and support a suitable guard member 241 which is preferably closed by a screen wire 242 as shown in Figure 2.

The shaft 234 has a sprocket wheel 244 fixedly mounted thereon on which a sprocket chain 245 is mounted (Figure 4). This sprocket chain 245 extends downwardly and rearwardly at an angle and is mounted on an idler take-up sprocket wheel 246 which is rotatably mounted on a stub shaft 247 projecting from an arm 250 which is adjustably secured, as by a screw 251, to the vertically disposed frame member 25. This sprocket chain 245 also engages a sprocket wheel 252 which is fixedly mounted on the end of the shaft 120 remote from the end on which the sprocket wheel 117 is fixedly mounted and it is thus seen that the shaft 120 transmits rotation to the sprocket wheel 244 to drive the ejector conveyor 200 in a clockwise direction in Figure 4.

It will be observed in Figures 8–A and 8–B that the upper edges of the trackway guides 172 and 173 extend at substantially the same elevation throughout their lengths and at a slightly higher elevation than the upper ends of the pins 150 and 151 on the main conveyor 130 so as to insure that the crackers or cakes which are slid along the upper edges of the tracks 153, 154 and 155 will not pass over the upper edges of the trackway guides 172 and 173. However, each of the trackway guide members 172 and 173 has a notch 255 in the upper edge thereof which is provided to accommodate a retaining plate associated with the magazine M–1, to be later described, and each of the trackway guide members 172 and 173 is also provided with a similar notch 256 disposed beneath the second magazine M–2.

Moreover, the upper edges of the trackway guide members 172 and 173 are provided with stepped cut-away portions or notches, the upper surfaces of the trackway guide members 172 and 173, defining the bottoms of said stepped notches or cut-away portions, being indicated at 257 and 258.

It is evident that the upper edges of the trackway guide members 172 and 173 are cut-away at 257 so as to permit the trackway guide members 172 and 173 to extend longitudinally of the machine beneath the gear pump 190 and in close proximity to the lower surface thereof since, as heretofore stated, it is necessary that the upper ends of the pins 150 and 151 move in closely spaced relation to the lower surface of the gear pump 190 and, also, the cracker or cake must move beneath the pump 190 in closely spaced relation thereto. The notch or cut-away portion 258 is provided to accommodate the free front end portion of a set of centering or equalizing devices broadly designated at 265.

These equalizer devices 265 operate similar to and for the same purpose as the equalizer devices comprising the guiding vanes 640 and 641 shown in Figure 22 of my said co-pending application. However, the devices 265 are more positive in their action and are easier and simpler constructed than the devices shown in said co-pending application. The front end of each of the trackway guides 172 and 173 (Figure 8–B) is also provided with a notch or cut-away portion, the bottom of the notch being indicated at 266. These notches 266 are provided to accommodate a second set of cake equalizer or centering devices broadly designated at 267 and which will also be later described in detail.

It has already been stated how the outside tracks 154 and 155 are supported at various points throughout their lengths by the track hangers 165, 166 and 167, depending from each of the transverse bars 45, 46, 47, 48 and 49, as well as the manner in which the trackway guides 172 and 173 are supported at various points by the bolts 174 which secure the trackway guides 172 and 173 to the corresponding tracks 154 and 155.

In order to insure that the trackway guides and the tracks of the respective trackways 152 and 152′ are accurately spaced the desired distance from each other, the front ends of all of the tracks and the trackway guides associated with the trackways 152 and 152′ are slidably penetrated by a common bolt 270 which has a plurality of spacers 271 of varying lengths mounted thereon as shown in Figure 17. It will be noted that these spacers are disposed between the middle tracks 153, 153′ and the respective outside tracks 154, 154′ and 155 and 155′. These spacers are also provided between the outside tracks 154, 154′, 155, 155′ and the respective trackway guides 172, 172′, and 173 and 173′. The proximate surfaces of the tracks 172 and 172′ at the front end of the machine, are held in proper spaced relation to each other by a tubular spacer 272 which is also mounted on the bolt 270. In order to provide for access to the opposed ends of the bolt 270, the bolt head and nut are spaced from the outer surfaces of the corresponding trackway guides 173 and 173′ by means of tubular spacers 273 and 273′ which are also mounted on the bolt 270.

It will be observed in Figure 8–B that the spacers 271, 272, 273 and 273′, as well as the bolt 270 are disposed beneath the rear ends of the chutes 195 and 195′ so they do not interfere with movement of the sandwiches as they move from the upper edges of the tracks 153 to 155 and 153′ to 155′, inclusive, onto the corresponding chutes 195 and 195′. The front ends of the tracks 153 to 155 and 153′ to 155′, inclusive, are supported in a manner to be later described.

*Magazines M–1 and M–2*

Since both the first and second magazines M–1 and M–2 are identical, only the first magazine M–1 will be described in detail and those parts of the magazine M–2, which are shown in the drawings and which are identical to corresponding parts of the magazine M–1, shall bear the same reference characters as those associated with the magazine M–1. Moreover, the parts of the magazines M–1 and M–2 which coincide with the trackway 152′ shall bear the same reference characters as the parts which coincide with the trackway 152 but shall have the prime notation affixed thereto.

In a broad sense, the magazines M–1 and M–2 are similar to the magazines described in said co-pending application but the magazines M–1 and M–2 are modified particularly for adaptation to the improved trackways 152, 152'.

The magazine M–1, which may also be termed a cracker or cake dispensing apparatus, comprises an angularly disposed bottom plate 280 which extends downwardly and forwardly at an angle from adjacent the rear end of the machine and through the upper surface of which two pairs of chute side wall members 281 and 281' are suitably secured. These chute side walls 281 and 281' and the bottom plate 280 define chutes 282 and 282' in which the crackers, cakes or the like are adapted to be placed by an operator and downwardly and forwardly in which the crackers or cakes move, by gravity, in juxtaposed relation to each other, these cakes or crackers being generally designated at C in Figures 9 and 10.

The cakes or crackers C slide down the corresponding chute 282 and normally engage a substantially vertically reciprocable cracker or cake retaining plate 285 which extends at right angles to the bottom 280 of the magazine M–1 as shown in Figure 9. The plate 285 is mounted for substantially vertical sliding movement at opposed ends thereof in angularly disposed guide bars 286 and 287 disposed adjacent the longitudinally extending frame members 11 and 14, respectively. These guide bars 287 are provided with grooves 290 in the inner surfaces thereof for slidable reception of the opposed ends of the plate 285.

The lower portions of the guide bars 286 and 287 are suitably secured, as by screws 291, to the front edge of a horizontally disposed magazine support bar 292, to the upper surface of which the bottom 280 of the magazine M–1 is also suitably secured. It might be stated that the magazine bottom 280 is also supported on a bar 293 (Figures 1, 2, 4 and 5) secured at opposed ends thereof to the upper ends of posts or rods 294 and 294a at opposed sides thereof, which rods 294 and 294a extend downwardly and are suitably secured to the respective side bars 11 and 14 of the frame 10. The opposed ends of the magazine support bar 292 are suitably secured, as by screws 295, to magazine standards 296 and 297 which extends downwardly and are suitably secured to the upper surfaces of the side bars 11 and 14.

Referring to Figures 9 to 12, inclusive, it will be observed that a gate supporting plate 301 is suitably secured to the rear surfaces of the angularly disposed guide bars 286 and 287, by any suitable means such as upper and lower screws 302 and 303, respectively. The lower screws 303 also serve to secure a cracker or cake hold-down bracket 305 to the rear surface of the plate 301. This hold-down bracket 305 is disposed immediately adjacent the upper edges of the chute side walls 281 and 281' and has two pairs of rearwardly and upwardly extending cake or cracker hold-down bars or members 306 and 306' suitably secured to the lower surface thereof, as by rivets 307 and 307', respectively. These hold-down bars 306, 306' are flared upwardly at their upper rear ends and are disposed between the corresponding pairs of chute side walls 281 and 281', respectively, for the purpose of directing any of the crackers, cakes or the like, which are placed in the corresponding chutes, downwardly towards the bottom 280 of the corresponding magazine to insure that the crackers, cakes or the like which are placed in the corresponding chutes 282, 282' are moved downwardly toward the bottom 280 of the corresponding magazine and to insure that the crackers or cakes are properly positioned to be ejected, one at a time, from each of the chutes 282, 282'.

Suitable substantially inverted U-shaped gates 310 and 310' straddle the gate support plate 301. The legs of the inverted U-shaped gates 310 and 310' are preferably formed from spring steel or other resilient material so as to bias the legs towards each other and to thereby cause the gates 310 and 311 to remain in a fixed position on the gate supporting plate 301 by frictional contact therewith. The front legs of the gates 310 and 310' are substantially longer than the rear legs thereof and the rear legs are provided with out-turned tabs 311 and 311' which may be grasped by an operator for raising or lowering the gates 310 and 310'. Upon lowering the gates 310 and 310', the rear legs thereof close the lower ends of the corresponding chutes 282 and 282' thus preventing the crackers or the like from being discharged from the chutes.

The retaining plate 285 is provided with two pairs of guide bars 318 and 318' spaced transversely which coincide with the corresponding chutes in the magazines M–1 and M–2 and between which the lowermost crackers or cakes C in the corresponding chutes are disposed during the ejection thereof from the corresponding magazine. These guide bars 318 and 318' are suitably secured to the plates 285.

Referring to Figure 12, it will be observed at the lower end of the plate 285, associated with each of the magazines M–1 and M–2, is provided with two pairs of notches or slots 319 and 319' which are spaced to correspond with the pins 150, 151 and 150' and 151' on the main conveyor 130 because, as the plate 285 is moved downwardly to eject a cracker or cake from the corresponding chute in the corresponding magazines M–1 and M–2, this plate 285 moves downwardly into the corresponding notches 255 (Figure 8) and 256 (Figure 8–B) in the trackway guide 172, 173 and 172 and 173' as will be more fully described later in this context.

The plate 285 has a cake ejecting plate 315 suitably secured to the rear surface thereof, by any suitable means such as bolts 316, which also serve to secure a transverse magazine actuating bar 317 to the front surface of the plate 285. It will be observed in Figures 11 and 12 that the bar 317 extends substantially beyond the vertical plane of the side frame members 11 and 14 and the opposed ends of the bar 317 associated with the magazine M–1 have the upper ends of links 320 and 321 pivotally connected thereto while the opposed ends of the bar 317 associated with the magazine M–2 have the upper ends of links 322 and 323 pivotally connected thereto (Figures 1 and 4).

These links 320 to 323, inclusive, may be reciprocated in any desired manner to cause the corresponding retaining plate 285 to reciprocate in timed relation to movement of the main conveyor 130 for discharging one cracker or cake C at a time from each of the corresponding chutes onto the corresponding tracks 153, 154, 155 and 153', 154' and 155'.

These links 320 to 323, inclusive, may be driven in a manner identical to that shown in said co-pending application and, in the present instance, the lower end of each of the links 320 and 321 is pivotally connected to the outer end of a corresponding crank arm 325 and the lower ends of the links 322 and 323 are connected to the outer ends of corresponding crank arms 326. The crank arms 325 are fixedly mounted on opposed ends of a transverse shaft 327 which is rotatably mounted in bearing blocks 330 suitably secured, as by bolts 331, to the upper surfaces of the longitudinally extending intermediate frame members 12 and 15.

The crank arms 326 are fixedly mounted on opposed ends of a transverse shaft 332 which is rotatably mounted in bearing blocks 333 suitably secured, as by bolts 334, to the upper surfaces of the longitudinally extending intermediate frame members 12 and 15.

Referring to Figures 1, 4 and 6, it will be observed that the shaft 327 is driven by means of a sprocket wheel 340. The sprocket wheel 340 has a sprocket chain 341 mounted thereon which extends upwardly and rearwardly at an angle and is mounted on a sprocket wheel 343 (Figure 6) fixedly mounted on the shaft 332 to thus cause continuous rotation of the shaft 332. This shaft 332 also has another sprocket wheel 343a fixed thereon on which a sprocket chain 344 is mounted. The sprocket chain 344 extends rearwardly and is mounted on a suitable sprocket wheel, not shown, fixed on a transverse idler shaft 346.

The transverse idler shaft 346 is rotatably mounted in bearing blocks 347 which are suitably secured, as by screws 350, to the upper surfaces of the intermediate side frame bars 12 and 15. The shaft 346 also has a second sprocket wheel, not shown, fixed thereon on which a front portion of a sprocket chain 351 is mounted. This sprocket chain 351 extends rearwardly and is mounted on a sprocket wheel 352 (Figure 5) fixed on the transverse shaft 327 to thereby impart continuous rotation to the shaft 327 (Figures 1 and 4).

*Filler dispensing means*

As heretofore stated, the filler dispensing means 188 is substantially the same as that shown in said co-pending application and includes a gear pump 355 which has suitable gearing therein, not shown, which is driven by means to be presently described, for exuding a mastic filler, such as peanut butter and the like, from the gear pump 355 through suitable gear pump gates indicated generally at 356.

These gates 356 are caused to reciprocate in a vertical manner by any suitable means such as that shown in said co-pending application and, in the present instance, suitable connections, not shown, are provided between the gates 356 and a link 360 (Figure 1) pivotally mounted on the free end of an actuating arm 361 which is pivotally mounted at its front end, as at 362, on the upper longitudinally extending frame member 11. This arm 361 has a cam follower 363 rotatably mounted thereon which rests in engagement with a cam wheel 364. The cam wheel 364 is fixedly mounted on a transverse shaft 365 which is rotatably mounted in bearing blocks 366 suitably secured to the lower surfaces of the longitudinally extending bars 11 and 14.

The shaft 365 has a sprocket wheel 370 fixedly mounted thereon (Figure 4) on which a sprocket chain 371 is mounted. The sprocket chain 371 extends downwardly and rearwardly in Figure 4 and is mounted on a sprocket wheel 372 which is fixedly mounted on one end of the shaft 346 heretofore described. It is thus seen that the shaft 346 causes a continuous rotation to be imparted to the cam wheel 364.

The gear pump 355 has a suitable hopper 375 secured to the upper surface thereof, as by screws 376, and which hopper is open at its bottom for communication with the gearing, not shown, within the gear pump 355. The hopper 375 has suitable agitators 380 disposed therein, only one of which is shown in Figure 1.

These agitators 280 are fixedly mounted on a transverse shaft 381 which is rotatably mounted in the side walls of the hopper 375. The outer end of the shaft 381 nearest the observer in Figure 1 has a crank arm 382 fixed thereon which extends rearwardly and has the upper end of a link 383 pivotally connected to the free end thereof. This link 383 extends downwardly and is pivotally connected to the free end of a crank arm 384 which is fixedly mounted on a transverse shaft 385 (Figures 1 and 4).

The shaft 385 has a sprocket wheel 386 fixed thereon intermediate the ends thereof, on which a sprocket chain 387 is mounted. The sprocket chain 387 extends rearwardly and is mounted on a sprocket wheel 390 (Figure 5) which is fixedly mounted on a transverse shaft 135 heretofore described.

The gear pump 355 is driven by means of a shaft 391 which extends outwardly from opposed sides thereof and opposed ends of which have sprocket wheels 392 fixed thereon. Each of the sprocket wheels 392 has a sprocket chain 394 mounted thereon which extends downwardly and rearwardly at an angle and is mounted on a corresponding sprocket wheel 395. The sprocket wheels 395 are mounted on opposed ends of the shaft 385 heretofore described and it is thus seen that continuous rotation is imparted to the shaft 391 as well as continuous oscillation being imparted to the agitators 380 within the hopper 375.

It will be noted that the filling dispensing means 188 is disposed in closely spaced relation to the upper surfaces of the side frame members 11 and 14 so the pins 150, 151, 150' and 151' move with the upper reach of the conveyor closely adjacent the lower surface of the gear pump 355. This is necessary since the crackers or cakes C must be disposed closely adjacent the corresponding discharge gates 356 to insure that the filler is properly deposited thereupon. The lower portions of the magazines M-1 and M-2 are disposed at the same elevation but in a slightly higher level than that of the lower surface of the gear pump 355 in order to provide space for the corresponding retaining plate 285 (Figure 9) within which to reciprocate so as to position the crackers or cakes C in proper relation to the pins 150, 151, 150' and 151' as they move with the upper reach of the conveyor 130.

Referring to Figures 8 and 9, it will be observed that there is disposed adjacent the lower edge of the plate 285 associated with the magazine M—1 a pair of hooked-shaped cracker or cake stop members 400 and 400' which are shown as being formed from a piece of wire and which are suitably secured, as by a pressed fit, in blocks or pins 401 and 401', the bifurcated lower ends of which are mounted upon the corresponding middle tracks 185 and 185'. Thus, the upper surfaces of the tracks 153, 154 and 155 are disposed at a substantially lower elevation than the adjacent upper edges of the trackway guides 172 and 173 and so the upper portions of the main conveyor pins 150 and 151 project substantially above the upper edges 185 of the trackways 153, 154 and 155.

Thus, upon each cracker or cake being discharged from the corresponding chute 282 associated with the magazine M—1, the corresponding cracker or cake C moves past the front end of the hook-shaped member 400 and then falls forwardly as the plate 285 subsequently moves upwardly. The last-named cake then falls beneath the hook member 400 and is subsequently moved along the tracks 153, 154 and 155 by the pins 150 and 151. The cracker or cake C then traverses the corresponding upper edges 186 on the tracks 153, 154 and 155 to the edge 187, which is spaced a relatively short distance below the lower surface of the gear pump 355 (Figure 8), to cause the upper surfaces of the crackers or cakes as they are moved by the pins 150 and 151, to be disposed closely adjacent the lower surface of the gear pump 355.

As the crackers or cakes move adjacent the corresponding gate 356, the gate 356 is opened momentarily by virtue of the cam follower 363 (Figure 1) being engaged by the high point of the cam 364. This permits the gear pump 355 to exude a predetermined amount of filler upon the corresponding cracker or cake subsequent to which this cracker or cake is moved between a pair of cake centering arms 403 and 404 which are parts of the cake centering or equalizing device 265, there being an identical cake centering or equalizing device 265' associated with the trackway 152'.

This cake centering or equalizing device 265 is most clearly shown in Figures 3, 7, 8–A and 15. The function of these arms 403 and 404 is two-fold in that the arms 403 are provided with cake hold-down clips or members 405 and 406, respectively, which are shown in the form of angle clips in Figure 15 and are suitably secured, as by rivets 407, to the outer surfaces of the bars 403 and 405 adjacent the free front ends thereof.

It will be observed in Figure 15 that the rear ends of the cake hold-down clips 405 and 406 are flared upwardly to insure that the cake being moved along by the pins 150 and 151 on the main conveyor 130 will be led beneath the clips 405 and 406. These clips 405 and 406 prevent the cake from being elevated through the adhesive character of the filler deposited thereupon since a certain amount of the filler directed to the cake may adhere to the gate 356 which may retard the movement of the cake or cause the cake to be raised upwardly as it is moved along by the pins 150 and 151.

The trackway guides 172 and 173 are necessarily provided with the notches 258 to accommodate the free front end portions of the arms 403 and 404 as heretofore described since these arms 403 and 404 converge inwardly adjacent and rearwardly of the clips 405 and 406. On the other hand, the rear portions of these arms 403 and 404 are disposed astride the trackway guides 172 and 173.

The rear ends of the arms 403 and 404 are each pivotally connected, as at 410, to a corresponding cake centering arm support member 411 (Figure 8) which is, in turn, supported for pivotal movement in a transverse plate 412 by means of a screw 413. It is preferred that the lower end of the screw 413 bottoms in the threaded hole 414 (Figure 15) provided therefor in the member 411 in order to insure that the member 411 may have pivotal movement on the plate 412.

It will be observed in Figure 7 that the plate 412 terminates substantially short of the opposed ends of transverse bar 46 and is secured to the upper surface thereof by any suitable means such as the corresponding screws 180, 181 and 182 which also secure the members 165, 166 and 167 to the lower surface of the bar 46 (see bar 47 in Figure 3).

Now, the upper edges of the cake centering arms 403 and 404 are disposed in substantially the same horizontal plane as the upper edges 257 of the trackway guides 172 and 173 so these cake centering arms 403 and 404 may pass beneath the gear pump 365. It is evident that the trackway guides 172 and 173 are recessed at 257 to clear the lower surface of the gear pump 355 and are of a slightly higher elevation in advance of the gear pump 355 to insure that the crackers or cakes may not be caused to ride over the upper edges of the trackway guides 172 and 173 at this point as they are moved along the inclined edges 186 on the tracks 153, 154 and 155 by the conveyor pins 150 and 151.

In order to insure that the cake centering arms 403 and 404 are moved inwardly or outwardly an exact distance relative to the center track 155, and to thereby insure that the corresponding cracker or cake is accurately centered between the trackway guides 172 and 173, the cake centering arms 403 and 404 extend forwardly substantially beyond the hold-down clips 405 and 406 and their outer surfaces, at their front ends, are engaged by the proximate surfaces of substantially L-shaped members or bell cranks 416 and 417 which are normally biased inwardly towards each other by a tension spring 420 which is suitabbly secured at opposed ends thereof, as at 421 and 422 (Figures 3, 7 and 15) to the vertical legs of the bell cranks 416 and 417.

These bell cranks 416 and 417 are each pivotally mounted at the juncture of their horizontal and vertical legs, as at 423, on a transverse frame member 424 which is shown in the form of an angle bar in Figure 15. It will be observed in Figure 15 that the proximate ends of the horizontal legs of the bell cranks 416 and 417 terminate in closely spaced relation to each other and are provided with concave or substantially semi-circular notches 425 therein within which a common pin 426 is slidably mounted. Thus, upon movement of one of the bell cranks 416 or 417 in either direction, like movement is imparted to the other of the bell cranks 416 or 417 in the opposite direction, inward and outward movement of the lower ends of the vertical legs of the bell cranks 416 and 417 is limited because of the proximity of the ends of the horizontal legs of the bell cranks 416 and 417.

It will be noted that the free ends of the cake centering arms 403 and 404 rest upon and in sliding engagement with the bottoms of the notches 258 of the trackway guides 172 and 173. The angle bar 424 is suitably secured, by the corresponding screws 180, 181 and 182 (Figures 7 and 8-A), to the upper surface of the transverse frame member or bar 47 heretofore described.

Referring to Figures 8-A and 8-B, it will be observed that after each cake is moved beyond the front ends of the cake centering bars 403 and 404, it is moved downwardly upon the inclined surfaces 190 of the tracks 153, 154 and 155 and then traverses the surfaces 191 on these tracks. In so doing, the latter cake passes beneath a cracker or cake support means designated broadly at 430 in Figures 7-A, 8-B and 10, which support means supports a second cracker or cake. This support means 430 comprises a pair of wire members 431 and 432 which are disposed in substantially the same vertical plane as the tracks 153 and 154 and which are spaced sufficiently above the corresponding tracks 153 and 154 to permit the first cakes or crackers to pass therebeneath. However, these wire members 431 and 432 are disposed in a substantially lower horizontal plane than the upper edges of the trackway guides 172 and 173 and also in a substantially lower horizontal plane than the upper ends of the main conveyor pins 150 and 151.

In fact, the upper surfaces of the wires 431 and 432 are disposed in substantially the same horizontal plane as the upper edges 185 of the corresponding portions of the tracks 153, 154 and 155 as shown in Figure 8. It will be observed in Figure 14 that the wires 431 and 432 project outwardly with respect to each other at the front ends thereof and the trackway guides 172 are provided with suitable notches or slots 434 through which the laterally projecting portions at the front ends of the wires 431 and 432 project, these portions of the wires 431 and 432 when being looped about corresponding bolts 436 which are secured in the trackway guides 172 and 173 for securing the front ends of the wires 431 and 432 thereto (Figure 10).

The rear ends of the wires 431 and 432 in Figure 14 are turned upwardly at right angles and then are turned outwardly again at right angles and extend above the upper edges of the trackway guides 172 and 173 and are then looped downwardly about corresponding bolts 440 disposed adjacent the rear walls of the notches 256 in the corresponding trackway guides 172 and 173. These bolts 440 are secured in the corresponding trackway guides for securing the rear ends of the wires 431 and 432 thereto.

Disposed adjacent and rearwardly of the path of travel of the plate 285 associated with the magazine M-2 (Figures 8-B and 14) is a hook member 441 which is shown as being formed from wire and which is spaced above the center or middle track 155 sufficiently to permit the first cracker or cake moved by the pins 150 and 151 to pass therebeneath. The hook member 441 is disposed slightly above the horizontal plane of the wires 431 and 432 so the second cracker or cake dispensed from the corresponding chute of the second magazine M-2 will pass forwardly of and then beneath the hook member 441 to cause the same to fall forwardly upon the wires 431 and 432.

The next succeeding conveyor pins 150 and 151 then engage this second cracker or cake resting upon the wires 431 and 432 and slides the same along the wires 431 and 432 while sliding the first cracker along the upper surfaces 191 of the tracks 153, 154 and 155 immediately beneath the second cracker or cake. The inclined surfaces 192 (Figure 8-B) of the tracks 153, 154 and 155 then cause the lower or first cracker to move upwardly so the leading edge thereof is disposed at a very slightly lower plane than the upper surfaces of the wires 431 and 432, with the result that the leading edge of the second cracker will engage the leading edge of the first cracker to be properly and accurately positioned thereupon with continued forward movement of the main conveyor pins 150 and 151.

The hook member 441 extends upwardly and rearwardly at an angle and is formed substantially U-shaped and the legs thereof are disposed astride the transverse frame member or bar 48 to which they are secured by any suitable means such as a bolt 442. It is evident that the parts associated with the trackway 152' and disposed in the same vertical plane thereof are provided with the same reference characters as those parts associated with the trackway 152 with the prime notation added to avoid a repetitive description thereof.

Referring again to Figure 8-B, the sandwich formed by the first and second crackers or cakes in the manner heretofore described, then slides along the inclined surfaces 192 on the tracks 153, 154 and 155 and thus onto the substantially level surfaces 193 of the tracks 153, 154 and 155. The pins 204 on the ejector conveyor 200 are so positioned relative to the pins 150 and 151 on the main conveyor 130, as the pins on the main conveyor 130 move downwardly and forwardly about the axis of the shaft 120, that the pins 204 pass between adjacent sandwiches and then engage and move the sandwich immediately in front of each set of pins forwardly and thus into the chute 195. Immediately following the engagement of the corresponding sandwich by the corresponding pins 204 on the ejector conveyor 200, the sandwich is engaged by the sandwich equalizer or centering device 267.

This sandwich centering device 267 is of similar structure to that of the cake or cracker equalizing or centering device 265 and comprises a pair of sandwich centering arms 445 and 446 whose rear ends are pivotally connected on a horizontal axis, as at 447, to corresponding sandwich centering arm support members 450. Each of the support members 450 has a reduced threaded upper portion 451 (Figure 16) which slidably penetrates a transverse bar 452 and which is supported therein by a pair of lock nuts 453. The transverse bar 452 is suitably secured to the upper surface of the transverse frame member or bar 49 by the corresponding screws 180, 181 and 182 which have heretofore been described as securing the track hangers 165, 166 and 167 to the lower surface of each of the transverse bars 45, 46, 47, 48 and 49.

Referring again to Figures 7-A and 16, it will be observed that the sandwich centering arms 445 and 446 extend forwardly and converge inwardly towards each other and each has a weight member 460 suitably secured to the outer surface thereof, as by rivets 461. It will be observed that the side walls of the chute 195 are bent downwardly at this point to form leaf portion 462 (Figures 16 and 17) at opposed sides thereof on which the weight members 461 may have lateral sliding movement. These weight members 461 also have suitable cake holddown plates 463 suitably secured to the upper surfaces thereof as by rivets 464. These cake hold-down plates 463 project upwardly and rearwardly at an angle to thus tend to press the uppermost of the cakes downwardly to cause the same to tightly adhere against the lower cake by means of the filler therebetween to complete the formation of the sandwich.

It is evident that the trackway guides 172 and 173 are cut away at 266 to provide for the front end portions of the sandwich centering arms 445 and 446. Now, these sandwich centering arms are caused to remain equidistant relative to the center of the trackway 152 inwardly and outwardly thereof by a means very similar to that described for the cake centering device 265 shown in Figure 15. However, it is evident that a transverse member, such as a member 424 associated with the first or cake centering device 465 (Figure 15), would interfere with operation of the ejector conveyor unit 200. Therefore, there is provided extending transversely of the machine and disposed below the chutes 195 and 195', a horizontally disposed plate 466 which is suitably secured at opposed side edges thereof, as by screws 467 (Figures 1 and 4) to the side frame members 11 and 14.

The plate 466 has a pair of transversely spaced rearwardly extending projections 470 and 470' thereon (Figures 16 and 17) which are disposed in alinement with the corresponding trackways 152 and 152'. The rearwardly extending projection 470 supports the front ends of the tracks 153, 154 and 155 and thus, these tracks serve to, in turn, support the trackway guides 172 and 173 by virtue of the bolt 270 heretofore described. Projecting upwardly adjacent opposed sides of the projection 470 are pins 472 and 473 which engage the outer surfaces of the front ends of the sandwich centering arms 445 and 446, the chute 195 being notched at opposed sides thereof, as at 474 (Figures 7-A and 17) to permit freedom of movement of the pins 472 and 473.

The pins 472 and 473 project downwardly, as shown in Figure 16, and are mounted in the free ends of substantially L-shaped members or bell cranks 476 and 477, respectively, (Figures 16 and 17). Each of the bell cranks 476 and 477 is pivotally mounted at the juncture of the legs thereof, as at 480, on the lower surface of the plate 466. The forwardly and rearwardly extending legs of the members 476 and 477 are normally urged towards each other by a tension spring 481 which is connected at opposed ends thereof to the pins 482 projecting through the respective bell cranks 476 and 477.

The proximate ends of the transverse legs of the bell cranks 476 and 477 terminate in closely spaced relation to each other and are provided with concavities or substantially semi-circular notches 483 in the proximate surfaces thereof in which a common pin 484 is slidably mounted. Thus, this pin 484 functions in the identical manner to the pin 426 in Figure 15 to cause like movement to be imparted to one of the bell cranks 476 or 477 upon the other of the bell cranks being moved in either direction. Thus, it is insured that the cakes shall be properly centered on the corresponding chutes 195 and 195' as they are moved therealong by the pins 204 projecting from the ejector conveyor 200.

It will be observed in Figure 4 that the chutes 195 and 195' terminate above the ingress end of a suitable conveyor indicated generally at 490 and onto which the finished product, in the form of the sandwiches, are directed as they traverse the chutes 195 and 195'. This conveyor 490 may be associated with a suitable packaging machine or the like.

It will be noted that the plate 466 also serves to support the chutes 195 and 195', there being suitable spacers 491 provided beneath the chute 195 and suitable spacers 491' being provided beneath the chute 195' for supporting the corresponding chutes 195 and 195' in spaced relation to the upper surface of the plate 456. The chutes 195 and 195' are secured to the upper surfaces of the spacers 491 and 491' by suitable screws 492 and 492', respectively, (Figures 7-A and 17) which screws 492 slidably penetrate the spacers 491 and 491' and are threadably embedded in the plate 466.

It is thus seen that I have provided an improved sandwich making machine having stationary tracks extending longitudinally thereof beneath a first magazine, a filler dispensing mechanism and a second magazine, successively, and wherein the two magazines are disposed in substantially the same horizontal plane while the dispensing mechanism is disposed at a slightly lower elevation, this lower elevation of the dispensing means being necessary due to an improved conveyor comprising endless chains which support transverse bars radially from which laterally spaced pins project, and these pins being adapted to pass between the tracks and the upper ends of the pins passing closely adjacent the lower surface of the filler dispensing mechanism as they moved the corresponding cakes along their width.

Moreover, I have provided an improved means associated with the second magazine for supporting a second cake as the first cake is moved therebeneath with the filler thereon and subsequent to which the second cake is moved off of the supporting means therefore by the same pins which move the first cake along the tracks and as a result of which, the second cake is positioned accurately atop the filler on the first cake.

In the drawings and specification there has been set forth a preferred embodiment of the invention and although specific terms are employed, they are used in a generic and descriptive sense only and not for purposes of limitation, the scope of the invention being defined in the claims.

I claim:

1. In a sandwich machine for forming sandwiches from cakes, crackers, and the like, with a filler therebetween; the combination of an elongated trackway having at least two laterally spaced substantially horizontally disposed tracks upon which cakes may be positioned, means movable in a substantially straight horizontal path for engaging each successive cake and moving the same along in engagement with the upper surfaces of said tracks, said tracks having longitudinally spaced parallel upper surface portions of varying heights and at least one intermediate upper surface portion on each track disposed between and being of a greater height than said first-named upper surface portions to successively vary the height of the cakes as they are moved along said tracks, and inclined upper surface portions disposed between and connecting adjacent first mentioned spaced upper surface portions of each track with said intermediate portions therebetween to facilitate movement of said cakes between adjacent spaced upper surface portions.

2. In a structure according to claim 1, trackway guides spaced adjacent the remote surfaces of the two laterally spaced tracks and having their upper edges generally disposed at a slightly higher elevation than the spaced and inclined upper surface portions of the tracks for confining the cakes on the tracks as they are moved therealong in engagement with the upper surfaces of said tracks.

3. In a sandwich machine for forming sandwiches from cakes, crackers, and the like with a filler therebetween; the combination of an elongated trackway having at least two laterally spaced substantially horizontally disposed tracks upon which cakes may be positioned, means movable in a substantially straight horizontal path for engaging each successive cake and moving the same along in engagement with the upper surfaces of said tracks, said tracks having serially arranged substantially horizontal first, second, and third upper surface portions on each track, said first upper surface portions being disposed at a slightly lower level than the next adjacent second upper surface portions whereby said means movable in a straight path may project a substantially greater distance above the level of the first upper surface portions than it does as it passes the second upper surface portions, a support member disposed above the third upper surface portions and onto which cakes may be placed, the third upper surface portions being at a sufficiently lower level than the first upper surface portions to permit the cakes propelled by said movable means to pass beneath the support member, and said support member also being disposed below the level of the upper portions of said movable means whereby cakes positioned upon said support member are moved off of the support member by said movable means and fall upon the cakes previously positioned upon the tracks as they are moved by said movable means.

4. In a sandwich machine for forming sandwiches from cakes, crackers, and the like with a filler therebetween, said machine having a driven substantially horizontal endless conveyor; the combination of at least one trackway comprising at least two laterally spaced tracks extending longitudinally of said machine above said conveyor and upon which cakes and the like may be deposited, a plurality of longitudinally spaced pairs of conveyor pins carried by and extending outwardly from said conveyor, the pins of each pair being spaced laterally from each other, said conveyor pins being movable in a straight line parallel to the conveyor and between said tracks, the upper surfaces of the rear ends of said tracks, relative to the direction of travel of said conveyor, being at a lower level than the upper surfaces of the medial portions of said tracks, the upper surfaces of said tracks also being at a lower level forwardly of said medial portions, and the upper ends of said conveyor pins projecting slightly above the level of the upper surfaces of the medial portions of said tracks as they move between said tracks to thereby vary the level of said cakes while moving the same along said tracks relative to the conveyor.

5. In a sandwich machine for forming sandwiches from cakes, crackers, and the like with a filler therebetween, said machine having a driven substantially horizontal conveyor; the combination of at least one trackway comprising at least two laterally spaced tracks extending longitudinally of said machine above said conveyor and upon which cakes and the like may be deposited, a plurality of longitudinally spaced pairs of conveyor pins carried by and extending outwardly from said conveyor, means for guiding said conveyor to cause said conveyor pins to move in a substantially straight horizontal path longitudinally of said machine between said tracks, the upper surfaces of the rear ends of said tracks, relative to the direction of travel of said conveyor, being at a lower level than the medial portions of said tracks, the upper surfaces of said tracks also being at a lower level forwardly of said medial portions, and the upper ends of said conveyor pins projecting slightly above the medial portions of said tracks as they move between said tracks to thereby vary the level of said cakes relative to the conveyor while moving the same along said tracks.

6. In a sandwich machine for forming sandwiches from cakes, crackers, and the like with a filler therebetween, said machine having a driven substantially horizontal conveyor; the combination of at least one trackway comprising at least two laterally spaced tracks extending longitudinally of said machine above said conveyor and upon which cakes and the like may be deposited, a plurality of longitudinally spaced pairs of conveyor pins carried by and extending outwardly from said conveyor, means for guiding said conveyor to cause said conveyor pins to move in a substantially straight horizontal path longitudinally of said machine between said tracks, the upper surfaces of the rear ends of said tracks, relative to the direction of travel of said conveyor, being at a lower level than the medial portions of said tracks, the upper surfaces of said tracks also being at a lower level forwardly of said medial portions, the upper ends of said conveyor pins projecting slightly above the medial portions of said tracks as they move between said tracks to thereby vary the level of said cakes relative to the conveyor while moving the same along said tracks, and at least one forwardly facing hook member disposed between at least one of said lower levels of said upper surfaces of said tracks and at a slightly higher elevation than the corresponding lower level whereby the cakes may be positioned upon the corresponding lower level of the upper surface of said tracks with one edge of each successive cake engaging the hook member to thereby insure that each successive cake is properly positioned for subsequent engagement by each successive pair of conveyor pins.

7. In a sandwich machine for forming sandwiches from cakes, crackers, and the like with a filler therebetween, said machine having a driven substantially horizontal conveyor; the combination of at least one trackway comprising at least two transversely spaced relatively narrow tracks extending longitudinally of said machine above said conveyor and upon which cakes may be deposited, said tracks being provided with parallel serially arranged first, second, and third upper surfaces, a plurality of longitudinally spaced conveyor pins carried by and extending upwardly from said conveyor and being adapted to move between said tracks, means for guiding said conveyor to cause said conveyor pins to move in a straight substantially horizontal path between said tracks, the first upper surfaces of said tracks being at a lower level than the second upper surfaces, the third upper surfaces of said tracks being at a lower level than the first upper surfaces of said tracks, the first surfaces of the tracks being at such a level relative to the height of the conveyor pins that said conveyor pins extend above the level of the first surfaces a distance slightly greater than the thickness of a single cake, the second surfaces being at such a level relative to the conveyor pins that the conveyor pins project above said second surfaces a distance substantially the same as the thickness of a cake, and the level of the third surfaces relative to the conveyor pins being such that said conveyor pins project above the third surfaces a distance substantially the same as the thickness of a pair of superposed cakes with a filler therebetween.

8. In a sandwich machine for forming sandwiches from cakes, crackers, and the like with a filler therebetween, said machine having a driven substantially horizontal conveyor; the combination of at least one trackway comprising at least two transversely spaced relatively narrow tracks extending longitudinally of said machine above said conveyor and upon which cakes may be deposited, said tracks being provided with parallel serially arranged first, second, and third upper surfaces; a plurality of longitudinally spaced conveyor pins carried by and extending upwardly from said conveyor and being adapted to move between said tracks, means for guiding said conveyor to cause said conveyor pins to move in a straight substantially horizontal path between said tracks, the first upper surfaces of said tracks being at a lower level than the second upper surfaces, the third upper surfaces of said tracks being at a lower level than the first upper surfaces of said tracks, the first surfaces of the tracks being at such a level relative to the height of the conveyor pins that said conveyor pins extend above the level of the first surfaces a distance slightly greater than the thickness of a single cake, the second surfaces being at such a level relative to the conveyor pins that the conveyor pins project above said second surfaces a distance substantially the same as the thickness of a cake, the level of the third surfaces relative to the conveyor pins being such that said conveyor pins project above the third surfaces a distance substantially the same as the thickness of a pair of superposed cakes with a filler therebetween, and longitudinally extending trackway guides disposed adjacent the outer surfaces of said tracks and having their upper edges disposed at a slightly higher level than the second upper surfaces of said tracks for guiding the cakes as they are moved along said tracks.

9. In a structure according to claim 8, a longitudinally extending support means carried by each of said trackway guides and being spaced above and extending in substantially parallel relation to said third surfaces of said tracks, and said support means being spaced from each other and being disposed at such an elevation as to permit the upper portions of the conveyor pins to pass therebetween whereby cakes previously positioned upon the tracks may pass beneath said support means and other cakes may be positioned upon said support means to subsequently be engaged by the conveyor pins and wiped off of the support means to thus be deposited upon the cakes previously positioned upon and moving in engagement with the upper surfaces of the tracks.

10. In a structure according to claim 9, said tracks having parallel forwardly and upwardly inclined upper surfaces extending for a part of their lengths, the lowest point of inclination starting from said third surfaces and at a point rearwardly of the vertical planes of the front ends of said support means, and the highest point of inclination being disposed beyond and above the front ends of said support means to cause the previously positioned cakes moving along said tracks to be slid upwardly by the corresponding pins to meet the corresponding cakes thereabove as they are slid off of the support means.

11. In a sandwich machine for forming sandwiches from cakes, crackers, and the like with a filler therebetween, said machine having a driven substantially horizontally horizontal conveyor; the combination of at least one trackway comprising at least two transversely spaced relatively narrow tracks extending longitudinally of said machine above said conveyor and upon which cakes may be deposited, said tracks being provided with parallel serially arranged first, second, and third upper surfaces, a plurality of longitudinally spaced conveyor pins carried by and extending upwardly from said conveyor and being adapted to move between said tracks, means for guiding said conveyor to cause said conveyor pins to move in a straight substantially horizontal path between said tracks, the first upper surfaces of said tracks being at a lower level than the second upper surfaces, the third upper surfaces of said tracks being at a lower level than the first upper surfaces of said tracks, the first surfaces of the tracks being at such a level relative to the height of the conveyor pins that said conveyor pins extend above the level of the first surfaces a distance slightly greater than the thickness of a single cake, the second surfaces being at such a level relative to the conveyor pins that the conveyor pins project above said second surfaces a distance substantially the same as the thickness of a cake, the level of the third surfaces relative to the conveyor pins being such that said conveyor pins project above the third surfaces a distance substantially the same as the thickness of a pair of superposed cakes with a filler therebetween, longitudinally extending trackway guides disposed adjacent the outer surfaces of said tracks and having their upper edges disposed at a slightly higher level than the second upper surfaces of said tracks for guiding the cakes as they are moved along said tracks, and portions of the upper surfaces of said trackway guides being cut away to form cavities whose bottoms are disposed at a slightly lower elevation than the upper surfaces of the corresponding portions of the tracks whereby a centering device may be positioned upon said bottoms formed by the cavities of the trackway guides for centrally alining the cakes upon said tracks.

12. In a sandwich machine for forming sandwiches from cakes, crackers and the like, said machine having a driven horizontal conveyor; the combination of at least one elongated track extending longitudinally thereof and immediately above said conveyor, said track including a medial upper surface portion of a given height and other upper surface portions spaced from opposite ends of said medial portion and being of a lesser height than said medial portion, said track also having an inclined upper surface portion extending from each of said other upper surface portions to said medial upper surface portion to facilitate movement of cakes between the medial portion and said other portions, at least two rows of longitudinally spaced pins carried by said conveyor and being movable adjacent opposite sides of and parallel to said track, and said pins projecting upwardly from said conveyor and having their upper ends terminating on a level above the level of said medial upper surface portion whereby a greater length of said pins projects above said other upper surface portions than does above said medial upper surface portion as the pins advance parallel to said track.

13. In a structure according to claim 12, trackway guides spaced adjacent the remote surfaces of the two rows of said pins, and the upper edges of said trackway guides being generally disposed on a slightly higher level than the adjacent upper surface portions of the track for confining the cakes on the track as they are moved therealong in engagement with the upper surface portions of said track.

14. In a sandwich machine having a driven horizontal conveyor; the combination of at least two spaced substantially parallel and relatively thin tracks extending longitudinally of and above the conveyor, the level of adjacent medial portions of said tracks being higher than that of other portions of the tracks at opposite ends of said medial portions, inclined upper surface portions on said tracks connecting said other portions with said higher medial portions, at least one row of upwardly extending longitudinally spaced members carried by said conveyor and being movable between and substantially parallel to said tracks with said conveyor, the outer ends of said members being disposed a substantially uniform distance from said conveyor and terminating on a level above that of the level of the medial portions of the upper edges of said tracks whereby a greater length of said members projects above the level of said tracks at said other portions than at said medial portions as the members advance between said tracks.

15. In a structure according to claim 14, a pair of trackway guides straddling and extending longitudinally of said two tracks, and the upper edges of said trackway guides being generally disposed on a slightly higher level than the adjacent upper surface portion of the tracks for confining articles on the tracks as they are moved therealong in engagement with the upper surface portions of said tracks.

References Cited in the file of this patent

UNITED STATES PATENTS

| | | |
|---|---|---|
| 1,160,532 | Savy | Nov. 16, 1915 |
| 1,460,825 | Peters et al. | July 3, 1923 |
| 1,493,480 | De Tour | May 13, 1924 |
| 1,667,692 | Solerno | Apr. 24, 1928 |
| 2,144,821 | Twomley | Jan. 24, 1939 |
| 2,394,795 | Manspeater | Feb. 12, 1946 |
| 2,520,493 | Curlee | Aug. 29, 1950 |
| 2,603,341 | Knee | July 15, 1952 |